United States Patent
De Carvalho Evangelista et al.

(10) Patent No.: US 12,513,719 B2
(45) Date of Patent: Dec. 30, 2025

(54) METHOD, DEVICE AND APPARATUS FOR OPTIMIZING GRANT FREE UPLINK TRANSMISSION OF MACHINE TO MACHINE (M2M) TYPE DEVICES

(71) Applicant: TELEFONAKTIEBOLAGET LM ERICSSON (PUBL), Stockholm (SE)

(72) Inventors: Joao Victor De Carvalho Evangelista, Montreal (CA); Georges Kaddoum, Laval (CA); Bassant Selim, Laval (CA); Aydin Sarraf, Pierrefonds (CA)

(73) Assignee: Valea AB, Gothenburg (SE)

( * ) Notice: Subject to any disclaimer, the term of this patent is extended or adjusted under 35 U.S.C. 154(b) by 353 days.

(21) Appl. No.: 18/253,440

(22) PCT Filed: Dec. 15, 2021

(86) PCT No.: PCT/IB2021/061795
§ 371 (c)(1),
(2) Date: May 18, 2023

(87) PCT Pub. No.: WO2022/130254
PCT Pub. Date: Jun. 23, 2022

(65) Prior Publication Data
US 2023/0422277 A1    Dec. 28, 2023

Related U.S. Application Data

(60) Provisional application No. 63/126,284, filed on Dec. 16, 2020.

(51) Int. Cl.
*H04W 72/50* (2023.01)
*H04W 4/70* (2018.01)

(52) U.S. Cl.
CPC ............. *H04W 72/50* (2023.01); *H04W 4/70* (2018.02)

(58) Field of Classification Search
CPC ................................ H04W 72/50; H04W 4/70
(Continued)

(56) References Cited

U.S. PATENT DOCUMENTS 10,609,724 B2    3/2020    Liu et al.
2012/0087317 A1*  4/2012   Bostrom ............... H04W 72/21
                                                370/329
(Continued)

FOREIGN PATENT DOCUMENTS

EP    3644673 A1    4/2020

OTHER PUBLICATIONS

C. Bockelmann et al. "Towards Massive Connectivity Support for Scalable mMTC Communications in 5G Networks", Mar. 5, 2018 IEEE Access.
(Continued)

*Primary Examiner* — Mark G. Pannell
(74) *Attorney, Agent, or Firm* — Weisberg I.P. Law, P.A.

(57) ABSTRACT

The disclosure relates to a method, device and non-transitory computer readable media or selecting a transmit power, a physical resource block (PRB), and a modulation and coding scheme (MCS) for a grant free uplink transmission. The method comprises obtaining an observation of the radio environment of the device. The method comprises selecting an action, based on the observation, for execution during a next time slot, the action comprising selecting the transmit power, the PRB, and the MCS for the grant free uplink transmission.

29 Claims, 15 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2017/0339648 | A1* | 11/2017 | Wang | H04W 52/38 |
| 2018/0110017 | A1* | 4/2018 | Jha | H04W 52/04 |
| 2019/0149274 | A1* | 5/2019 | Freda | H04L 1/1819 370/329 |
| 2020/0296741 | A1* | 9/2020 | Ayala Romero | H04W 72/535 |
| 2021/0243784 | A1* | 8/2021 | Goto | H04W 72/21 |
| 2022/0007411 | A1* | 1/2022 | Takeda | H04W 72/23 |

OTHER PUBLICATIONS

J.V.C. Evangelista et al., Intelligent Link Adaptation for Grant-Free Access Cellular Networks: A Distributed Deep Reinforcement Learning Approach, ar.Xiv:2107.04145v1, Jul. 8, 2021.

Kelvin Au et al., Uplink Contention Based SCMA for 5G Radio Access, Globecom 2014 Workshop—Emerging Technologies for 5G Wireless Cellular Networks, 2014 IEEE, 6 pages.

Nicholas Mastronarde et al., Joint Physical-Layer and System-Level Power Management for Delay-Sensitive Wireless Communications, IEEE Transactions on Mobile Computing, vol. 12, No. 4, Apr. 2013, 16 pages.

Nicholas Mastronarde et al., Reinforcement Learning for Energy-Efficient Delay-Sensitive CSMA/CA Scheduling, 2016 IEEE, 7 pages.

Y.S. Nasir et al., "Multi-agent deep reinforcement learning for dynamic power allocation in wireless networks," IEEE Journal on Selected Areas in Communications, vol. 37, No. 10, Oct. 2019, pp. 2239-2250.

Z. Jiang et al., AI-Assisted Low Information Latency Wireless Networking, IEEE Wireless Communications, Feb. 2020, pp. 108-115.

International Search Report and Written Opinion from corresponding application PCT/IB2021/061795.

* cited by examiner

1100

---
Algorithm 1: PPO algorithm
---
Initialization

1) Set learning rate $\alpha \in [0, 1)$.

2) Set $\epsilon, k_1, k_2$.

3) Initialize $w_{old}$ randomly

4) Set $s_0 \in \mathcal{S}$.

5) Set $t \leftarrow 0$ loop for $t = 1...|\mathcal{T}|$ do

$a_t \sim \pi_{w_{old}}(a|s)$;

$s_{t+1} \sim \mathbb{P}(s|s_t, a_t)$;

$c_{t+1} \sim \mathbb{P}(c|s_t, a_t)$;

$A(s_t, a_t) \leftarrow \sum_{k=1}^{t} c_k \gamma^{k-1} - V_{\pi_{w_{old}}}$;

end for $n = 1...N_{epochs}$ do

Sample minibatch of $\mathcal{T}'$ of size $|\mathcal{T}'| < |\mathcal{T}|$;

$w \leftarrow w + \alpha \nabla_w J^{surr}(w)$;

end

$w_{old} \leftarrow w$ end ;

METHOD, DEVICE AND APPARATUS FOR OPTIMIZING GRANT FREE UPLINK TRANSMISSION OF MACHINE TO MACHINE (M2M) TYPE DEVICES

PRIORITY STATEMENT UNDER 35 U.S.C. S.119(E) & 37 C.F.R. S.1.78

This non-provisional patent application claims priority based upon the prior U.S. provisional patent application entitled "METHOD, DEVICE AND APPARATUS FOR OPTIMIZING GRANT FREE UPLINK TRANSMISSION OF MACHINE TO MACHINE (M2M) TYPE DEVICES", application No. 63/126,284, filed Dec. 16, 2020, in the names of de Carvalho Evangelista et al.

TECHNICAL FIELD

The present disclosure relates to the field of cellular telecommunications, and more specifically to the problem of link adaptation in grant-free random-access transmission for massive machine type communication.

BACKGROUND

The 5th Generation (5G) of mobile communication is required to support diverse applications. The most common scenarios are enhanced Mobile Broadband (eMBB), massive Machine Type Communication (mMTC), and Ultra Reliable Low Latency Communication (URLLC). mMTC, is propelled by the need to support machine-to-machine (M2M) communication over cellular networks. M2M communication is different from human to human (H2H) communication in several ways. In particular, M2M communication has the following characteristic: 1) the packets are smaller, 2) the transmission is more sporadic, and 3) the quality of service (QoS) requirements are more diverse. As a result, the scheduling procedure for M2M communication is fundamentally different from H2H communication.

A considerable amount of M2M devices will be battery driven, whereas in currently deployed wireless systems, a lot of energy consumed by the communicating devices is allocated to establish and maintain connections. As identified in "K. Au, L. Zhang, H. Nikopour, E. Yi, A. Bayesteh, U. Vilaipornsawai, J. Ma, and P. Zhu, Uplink contention based SCMA for 5G radio access, in IEEE Globecom Workshops, December 2014, pp. 900-905", when transmitting small packets, the grant request procedure can result in 30% of resource elements overhead. While semi-persistent connection, as adopted by the narrowband internet of things (NB-IoT) standard, might reduce the signaling overhead, it can only do so efficiently in the case of periodic traffic arrival.

A grant-free access mechanism can enable devices to transmit data in an arrive and-go manner in the next available slot. Various grant-free approaches are considered in the literature; most works focus on the decoding and feedback procedure.

In U.S. Ser. No. 10/609,724, a method for determining the modulation and coding scheme (MCS) in grant free uplink transmission is proposed based on a limit MCS received by the base station.

In EP3644673, the user equipment (UE) selects a grant-free transmission resource configuration from a set of available options configured and sent from the base station. The UE selects the configuration based on its service performance index requirement and/or an amount of data to be transmitted. Such static solution can easily lead to a greedy behavior that can hinder the overall performance of the network.

In "N. Mastronarde and M. van der Schaar, Joint physical-layer and system-level power management for delay-sensitive wireless communications, IEEE Trans. Mobile Comput., vol. 12, no. 4, pp. 694-709, April 2013", a reinforcement learning algorithm is proposed to jointly select an AMC, and dynamic power management (DPM), in order to minimize the transmitted power in a single-user system while satisfying a certain delay constraint.

Afterwards, in "N. Mastronarde, J. Modares, C. Wu, and J. Chakareski, Reinforcement Learning for Energy-Efficient Delay-Sensitive CSMA/CA Scheduling, in IEEE Global Communications Conference, 2016, pp. 1-7" the previous work is extended to consider a multiuser system in a IEEE 802.11 network with carrier sensing multiple access (CSMA). In this work, the authors considered three users contending for channel access, and adopted an independent learners approach, where each user optimizes its own rewards, ignoring the interaction from other users. Despite its simplicity, the independent learners solution is known to have several issues, such as, Pareto-selection, nonstationarity, stochasticity, alter-exploration and shadowed equilibria.

SUMMARY

There is a need for optimizing the access procedure in grant-free access. In grant-free access, due to the lack of scheduling on orthogonal time-frequency resources, there is a high probability that different devices randomly choose the same resource blocks for the uplink transmission, resulting in the superposition of data (collision). Moreover, grant-free transmission poses new challenges in the design of physical layer (PHY) and medium access control (MAC) protocols. Static policies for adaptive modulation and coding (AMC), power control, and packet retransmission are not efficient and would not be able to scale to the diverse throughput, latency, and power saving requirements of mMTC.

Herein, a partially observable stochastic game (POSG) to model PHY and MAC dynamics of a grant-free mMTC network is described. A multiagent reinforcement learning (MARL) framework is employed for a distributed decision-making solution that captures the interaction between PHY and MAC. As a result, the network performance is improved in terms of transmission latency and energy efficiency compared to baseline schemes, while keeping communication overhead to a minimum.

There is provided a method for selecting, for a device, a transmit power, a physical resource block (PRB), and a modulation and coding scheme (MCS) for a grant free uplink transmission. The method comprises obtaining an observation of the radio environment of the device. The method comprises selecting an action, based on the observation, for execution by the device during a next time slot, the action comprising selecting the transmit power, the PRB, and the MCS for the grant free uplink transmission.

There is provided a device for selecting a transmit power, a physical resource block (PRB), and a modulation and coding scheme (MCS) for a grant free uplink transmission. The device comprises processing circuits and a memory, the memory containing instructions executable by the processing circuits whereby the device is operative to obtain an observation of the radio environment of the device. The device is operative to select an action, based on the observation, for execution during a next time slot, the action comprising selecting the transmit power, the PRB, and the MCS for the grant free uplink transmission.

There is provided a non-transitory computer readable media having stored thereon instructions for selecting a transmit power, a physical resource block (PRB), and a modulation and coding scheme (MCS) for a grant free uplink transmission. The instructions comprise obtaining an observation of the radio environment of the device. The instructions comprise selecting an action, based on the observation, for execution by the device during a next time slot, the action comprising selecting the transmit power, the PRB, and the MCS for the grant free uplink transmission.

The methods, devices, apparatus and systems provided herein present improvements to the way link adaptation in grant-free random-access transmission for massive machine type communication operate. The solution described herein grants free multiple access transmission and allows the selection of the modulation and coding scheme, the physical resource block (PRB), and the transmission power that minimize the power consumption while satisfying delay constraints. It supports diverse QoS requirements and packet arrival intensities and offers a learnable dynamic policy for a fast and energy-efficient grant-free transmission.

BRIEF DESCRIPTION OF THE DRAWINGS

FIG. 11 illustrates the PPO algorithm.

DETAILED DESCRIPTION

Figure 1:
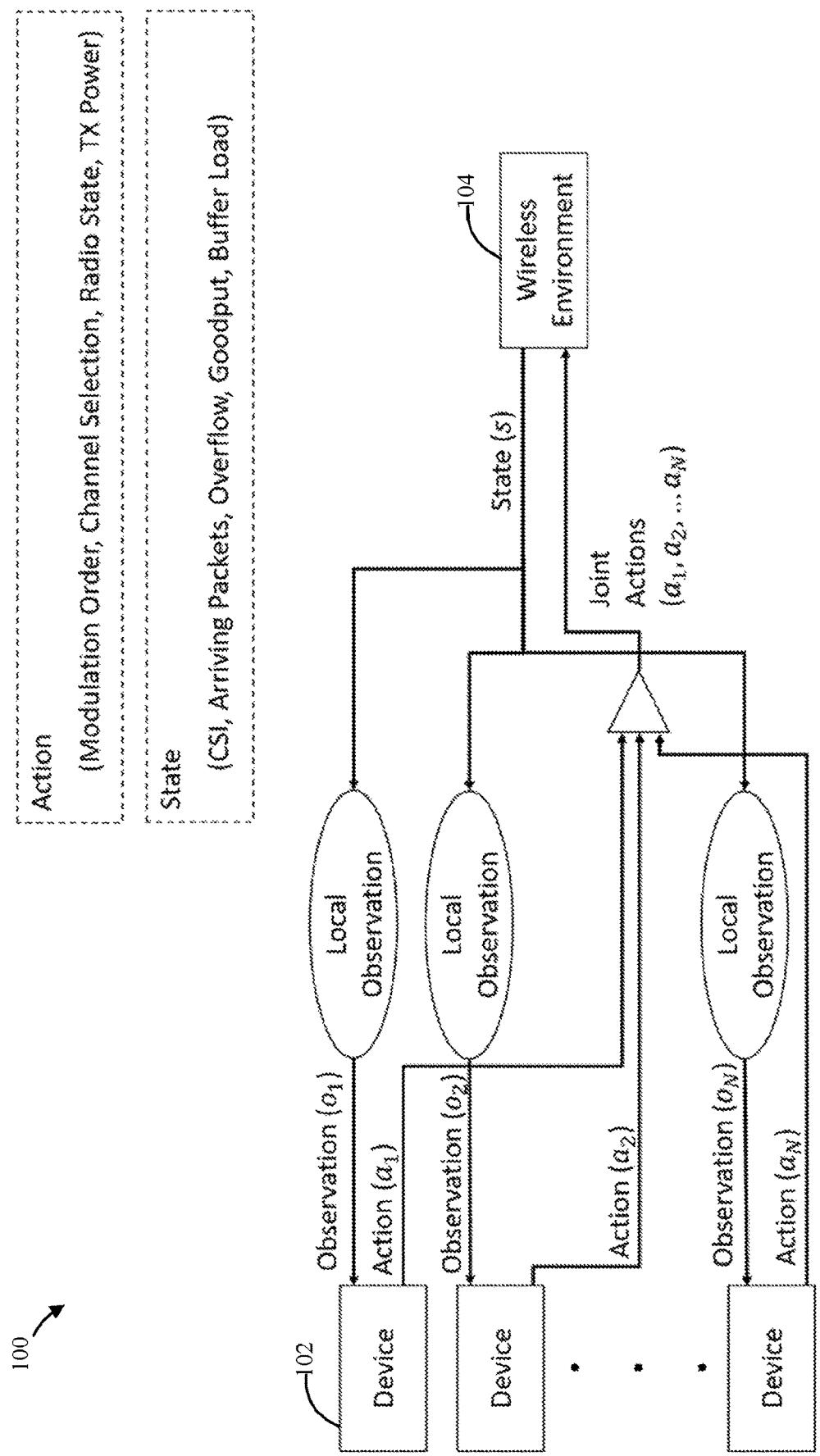
FIG. 1 is a schematic illustration of a macro view of an example system as described herein.

Various features will now be described with reference to the drawings to fully convey the scope of the disclosure to those skilled in the art.

Sequences of actions or functions may be used within this disclosure. It should be recognized that some functions or actions, in some contexts, could be performed by specialized circuits, by program instructions being executed by one or more processors, or by a combination of both.

Further, computer readable carrier or carrier wave may contain an appropriate set of computer instructions that would cause a processor to carry out the techniques described herein.

The functions/actions described herein may occur out of the order noted in the sequence of actions or simultaneously. Furthermore, in some illustrations, some blocks, functions or actions may be optional and may or may not be executed.

Traditional cellular networks are designed to be used with a grant-based procedure where a user device requests for a channel in order to transmit data. In turn, the base station resolves the request and allocates a channel to the user device, if available, to allow the user device to transmit its data. However, for machine-to-machine communication, the better approach may be to use grant free access to transmit data directly on the random-access channel. That is because the machine-to-machine devices often transmit small packets and the grant-based process of requesting the allocation of a channel for small packets may take more power and resources than direct transmission of the data on the random-access channel, which completely avoids requesting the allocation of a channel.

The grant-free approach comes with some challenges, however, because although there is less overhead, there are more collisions, which can occasion the need to retransmit the packets several times, which ends up taking more resources than with the grant-based procedure. Therefore, an approach to optimize the grant-free approached is described herein.

It is proposed to use multi agent reinforcement learning to decide when and how to access the random-access channel. Multi agent reinforcement learning is a framework that can handle requirements related to massive deployment of devices with diverse characteristics, different latency requirements, different power requirements, etc. Multi agent reinforcement learning provides the flexibility and power to adapt to such requirements and can be deployed in a decentralized manner which mitigates complexity and reduces overhead of communicating decisions between devices or between the base station and the devices.

The problem is modeled in terms of a state that varies with time and an environment that determines how the state varies, and actions taken by the agents that shape what the next state will be depending on the environment, the actions and maximization of a reward signal.

The actions available for the agents are, for example, to adjust the transmit power, switching the radio to either the idle or transmit mode, deciding on which subcarrier to transmit, and the modulation order. The objective of the agents is to minimize the transmit power subject to device specific constraints.

Challenges include that agents can only access local information, there is no guarantee of convergence to an equilibrium in multi agent reinforcement learning, and the search space increases exponentially with the addition of devices. Another challenge is how to learn a good policy or protocol sharing as little information as possible between the agents.

As will be described in more details below with reference to the figures, multi-agent reinforcement learning is employed to select the transmit power, PRB, and MCS. For each transmission time interval (TTI), a partially observable stochastic game (POSG) is used to model how multiple agents with distinct and possibly adversarial goals interact with a stochastically changing environment in discrete time slots. At each time slot, the agents receive a partial, and possibly noisy, observation of the environment and selects an action to take in the next time slot based on this observation. Each action incurs a reward, and the objective of the agents is to learn a policy that maximizes its rewards. Each device aims to find a stochastic policy that minimizes its infinite-horizon cost function non-cooperatively. One goal in the proposed scenario is to minimize the average discounted expected transmit power subject to a constraint on the discounted expected delay costs, resulting in a constrained Markov decision process (CMDP).

In a grant free multiple access configuration, where the nodes have the liberty to send their data to the base station without prior handshake, the selection of the transmit power, PRB, and MCS affect the time required (delay) for the data to be successfully received at the base station and the energy consumed by the node to successfully transmit the data. A method is provided to select the transmit power, PRB, and MCS to satisfy the nodes' delay constraints while consuming minimal power for data transmission. At the beginning of each transmission time interval, every node decides to go into transmit mode or idle mode to save power. If a node is in transmit mode, it selects a transmit power, the PRB, and the MCS. Then, it draws a random backoff time as a function of its MCS. During the backoff time the node listens to the channel and if it doesn't sense any transmission during the backoff interval it transmits a packet in the rest of the TTI. To select the transmit power, PRB, and MCS, Multi-agent reinforcement learning can be employed at the nodes.

Three learning strategies based on the actor/critic algorithms are proposed and are described in more details below: independent learners (IL), distributed actors with centralized critic (DACC) and centralized learning with decentralized inference (CLDI).

In the independent learners approach, each device trains an actor neural network which will be used to decide which actions to take, and also train a critic neural network which evaluates the value of the current state.

In the approach with distributed actors and centralized critic, each device trains an actor neural network, while the critic neural network is centralized in the cloud and collects and aggregates data from all the devices to train a single critic for all the devices. This enables some level of cooperative behaviors between the devices and a better use the spectrum. However, this has for cost that some state information needs to be provided by the devices and a critic value has to be broadcasted to the devices to allow the devices to train their local actor neural networks.

In the approach with centralized learning and decentralized inference, there is a single central neural network, that is trained in the cloud, and fed back to the devices. This removes the burden of training a neural network by the devices and provides a single policy that is shared between all the devices, thereby reducing the search space i.e., when new devices are added, the search space for the optimal policy is not increased. Experimental data has shown that the centralized learning and decentralized inference approach outperforms the other approaches in terms of delay, dropped packets, power consumption and collisions.

FIG. 1 presents a macro view 100 of the system model. There is a set of devices 102 interacting with a wireless environment 104. The wireless environment has an internal state which the devices observe, however the devices only see partial information of the global state. From these observations. the devices decide on which action to take. The future state of the wireless environment depends only on the current state and on the joint action taken by the devices.

Figure 2:
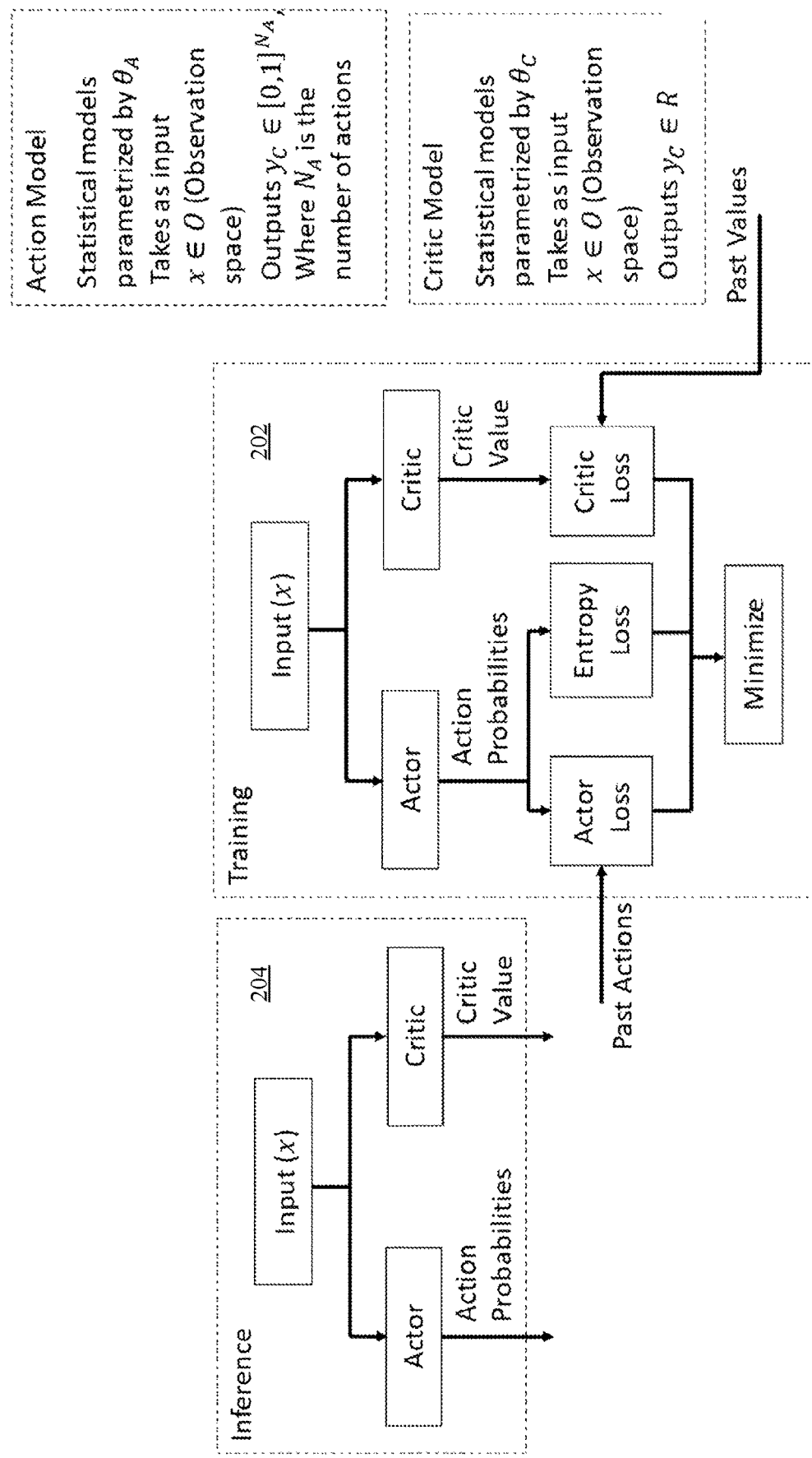
FIG. 2 is a schematic illustration of example learning and decision-making procedures.

FIG. 2 presents an overview of the learning procedure (training) 202 and the decision-making procedure (inference) 204. During the inference step, the input goes through the actor and the critic artificial neural network, obtaining the probabilities of selecting an action and an estimation of the value of the current observation. An action is selected by sampling according to the probabilities. From the joint action and the current state of the environment, the device receives a reward. The selected action, the current observation, the reward obtained, and the critic value are stored to be used in the training procedure. The tuple containing these stored values per each time slot is called an experience tuple. During the training procedure, the devices sample experience tuples randomly and from the previous experience they compute an action loss, an entropy loss and a critic loss, all three differentiable, from which they can update the weights of the artificial neural network by minimizing these three loss functions.

FIGS. 3 to 7 present algorithms corresponding to three learning architectures proposed herein. They all consist of three steps: obtaining the observation, selecting an action and training the actor-critic model. In all three architectures these steps occur similarly, mostly differing in where the step happens (in the device or in the cloud).

Variables used in FIGS. 3 to 7 are defined as follows. Action (a): Modulation Order $\beta$, Subcarrier Selection $\theta$, Radio State $\gamma$, Transmit Power p. State (s): Channel State Information H, Arrivals 1, Goodput g, Overflow o, Buffer Load b, Radio State x. Other variables: Buffer Length B, Backoff Time $\tau$.

Figure 3:
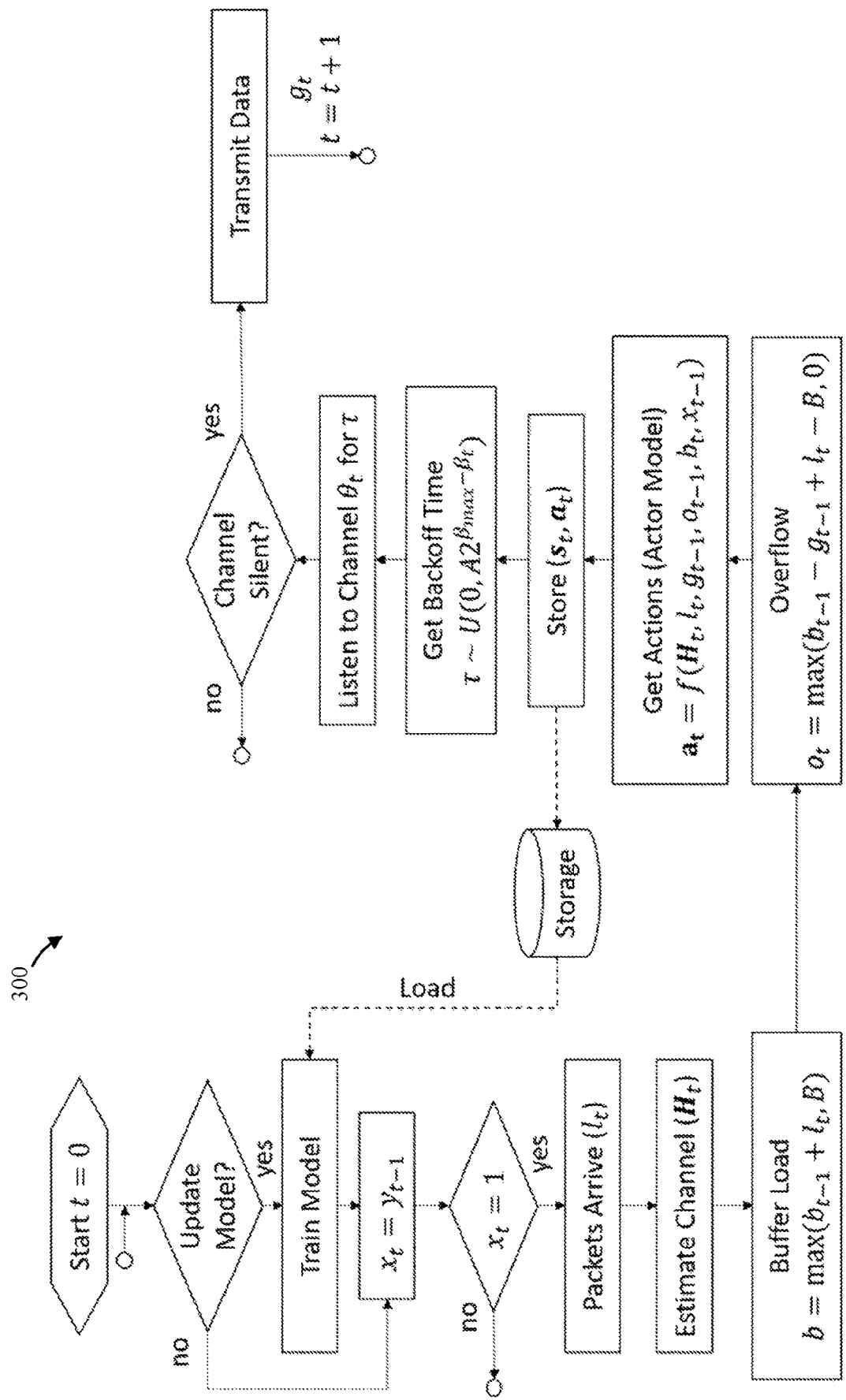
FIG. 3 is a flowchart of an example method executed by independent learners.

In FIG. 3, the step-by-step procedure of the Independent Learners 300 architecture is described. In the beginning of each iteration, at time 0, the device first checks to see if it should update its neural network model (policy) (which happens periodically). In case of yes it uses the experience stored (in storage) from previous interactions with the environment as described in FIG. 2. After training the model (of after skipping the training), the device obtains its current local observation, from which it uses the model to select an action. If $x_t=1$, the device is going to try transmitting in this time slot, and if not, the flow returns to the beginning. Then the number of packets that arrived is estimated, the channel quality is estimated, the buffer load is calculated (i.e., how many packets are in the buffer), the number of packets that are dropped is calculated as the overflow. This information is fed into the actor (hereinafter, actor and agent may be used interchangeably) neural network, which provides a decision, which is an action. This action and the state are stored in the storage and will be used for subsequent rounds of training. A backoff time can be calculated and then the device listens to the channel for the length of this backoff time, which is random. If during this backoff time the channel is silent, the device transmits its data.

In summary, depending on the action, the device tries to access the wireless channel, if it gains access, the device transmits its data with physical layer parameters chosen according to the selected action. Otherwise, it starts the procedure again. The cloud plays no part in the independent learners architecture.

Figure 4:
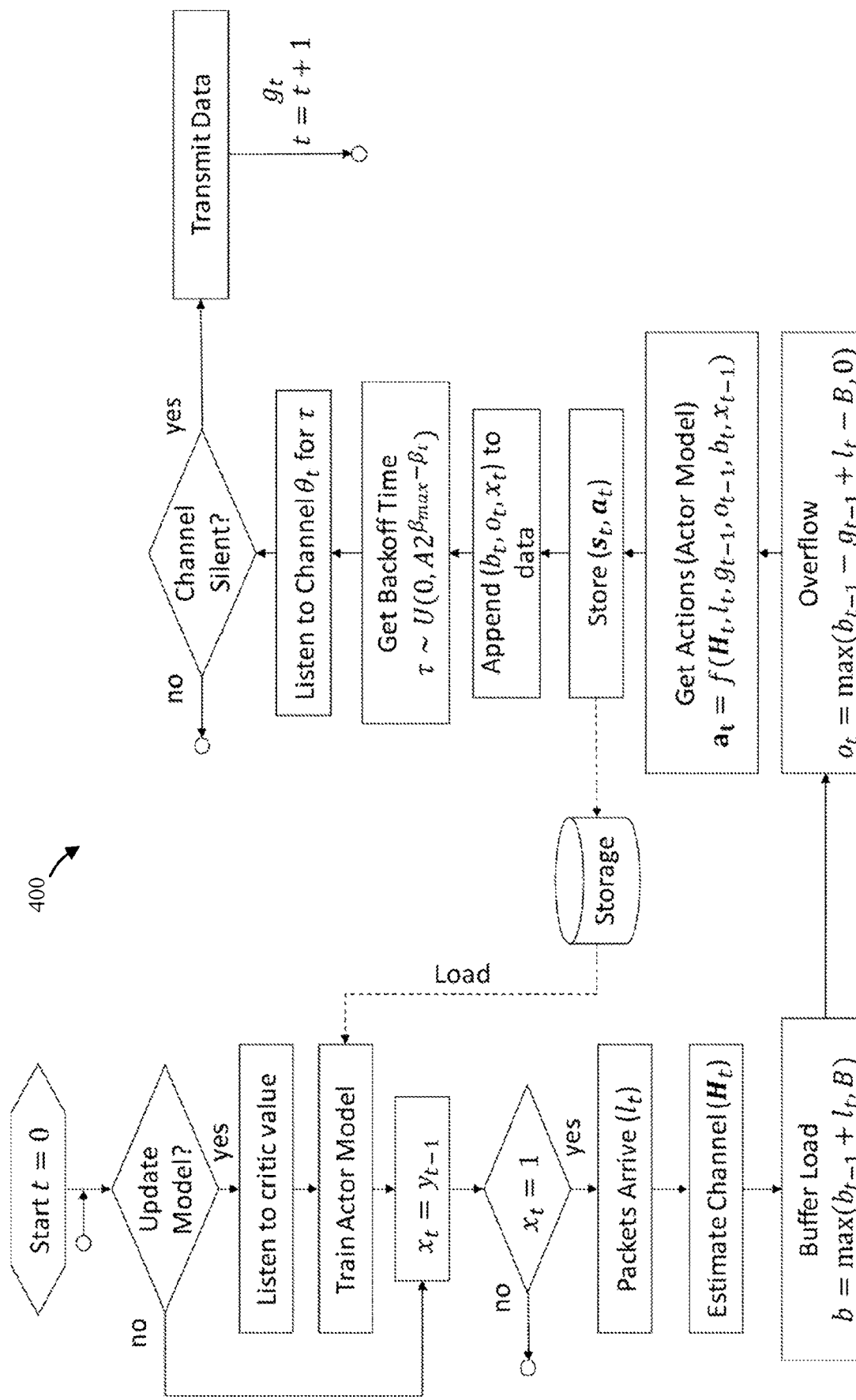
FIG. 4 is a flowchart of an example method executed by distributed actors and a centralized critic on the device side.

In FIGS. 4, the procedure realized by the device on the Distributed Actors with Centralized Critic 400 is outlaid. The procedure is similar to the one illustrated in FIG. 3, however, instead of calculating the critic value on the device, a single critic value is computed, based on data collected from all devices. Hence, before updating the actor artificial neural network weights, the device listens to the broadcast channel to receive the critic value.

Figure 5:
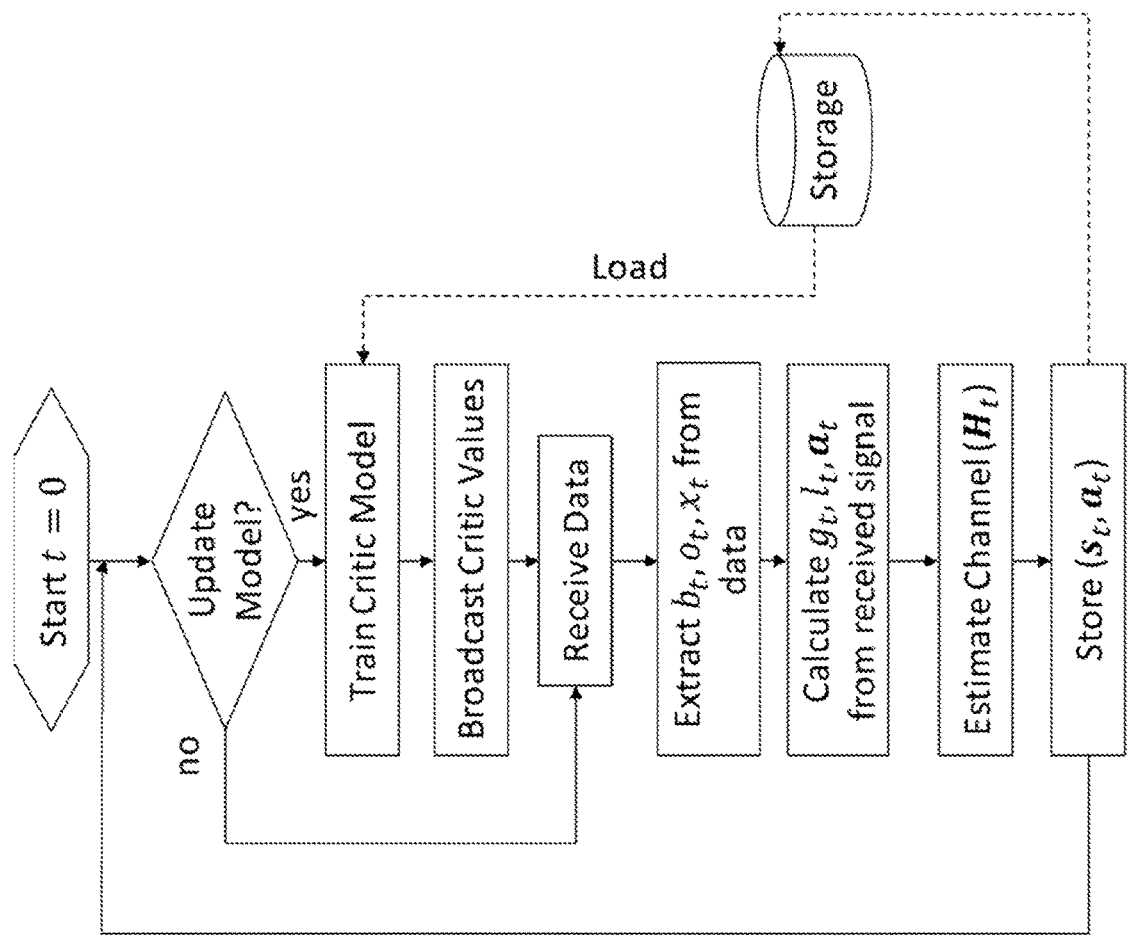
FIG. 5 is a flowchart of the cloud environment side of the method of FIG. 4.

In FIG. 5, the procedure 400 is executed in the cloud. It consists mainly of extracting state information from the received data and updating the critic artificial neural network weights periodically and broadcasting critic values.

Figure 6:
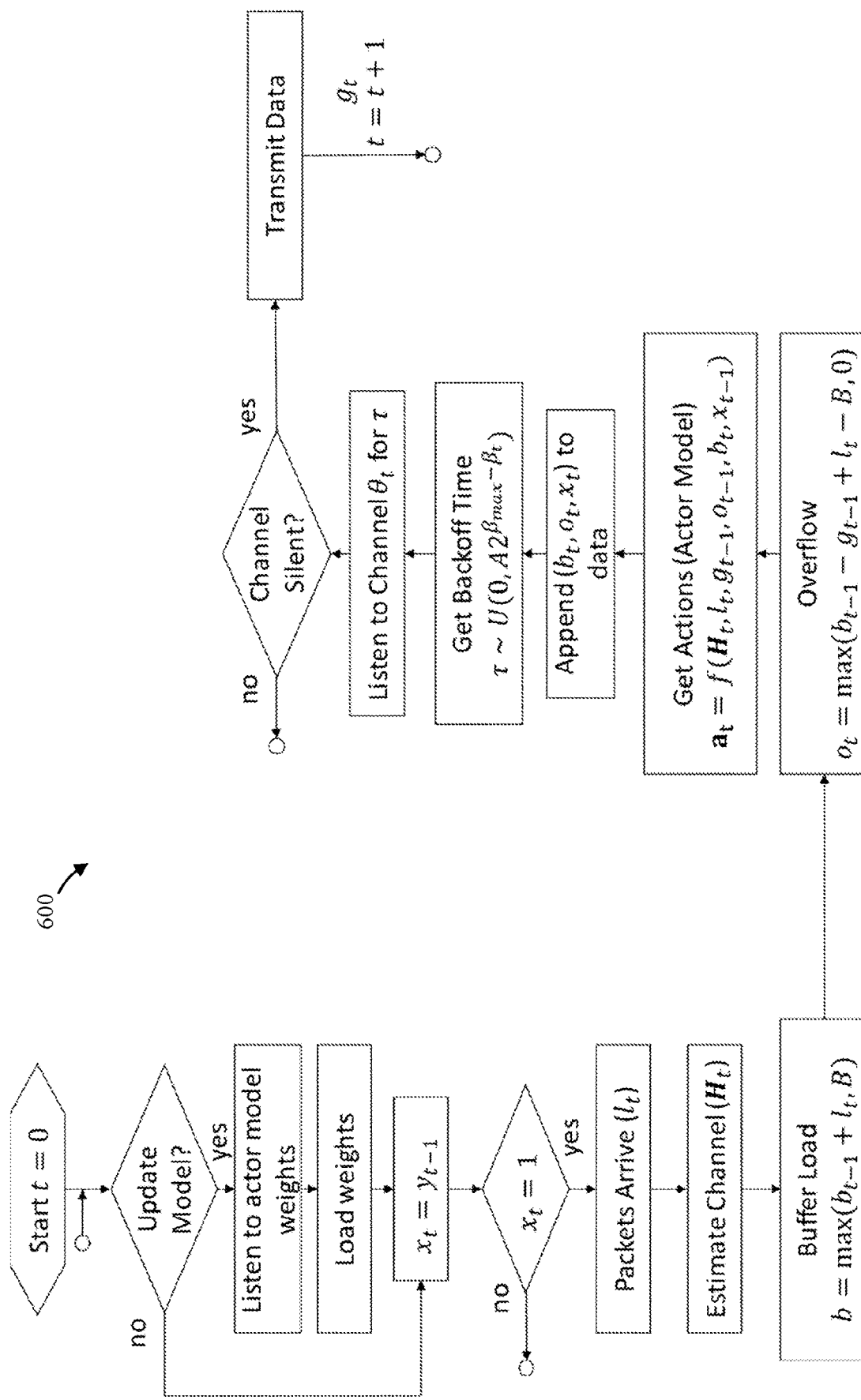
FIG. 6 is a flowchart of an example method executed by centralized learning with a decentralized inference architecture on the device side.

In FIGS. 6, the procedure executed by the device on the Centralized Learning with Decentralized Inference 600 architecture is outlaid. The observation and decision-making steps remain the same as in the previous architectures, but instead of training its model, the device simply listens to the artificial neural network weights from the broadcast channel and use these weights to configure and update the neural network used for making the decision.

Figure 7:
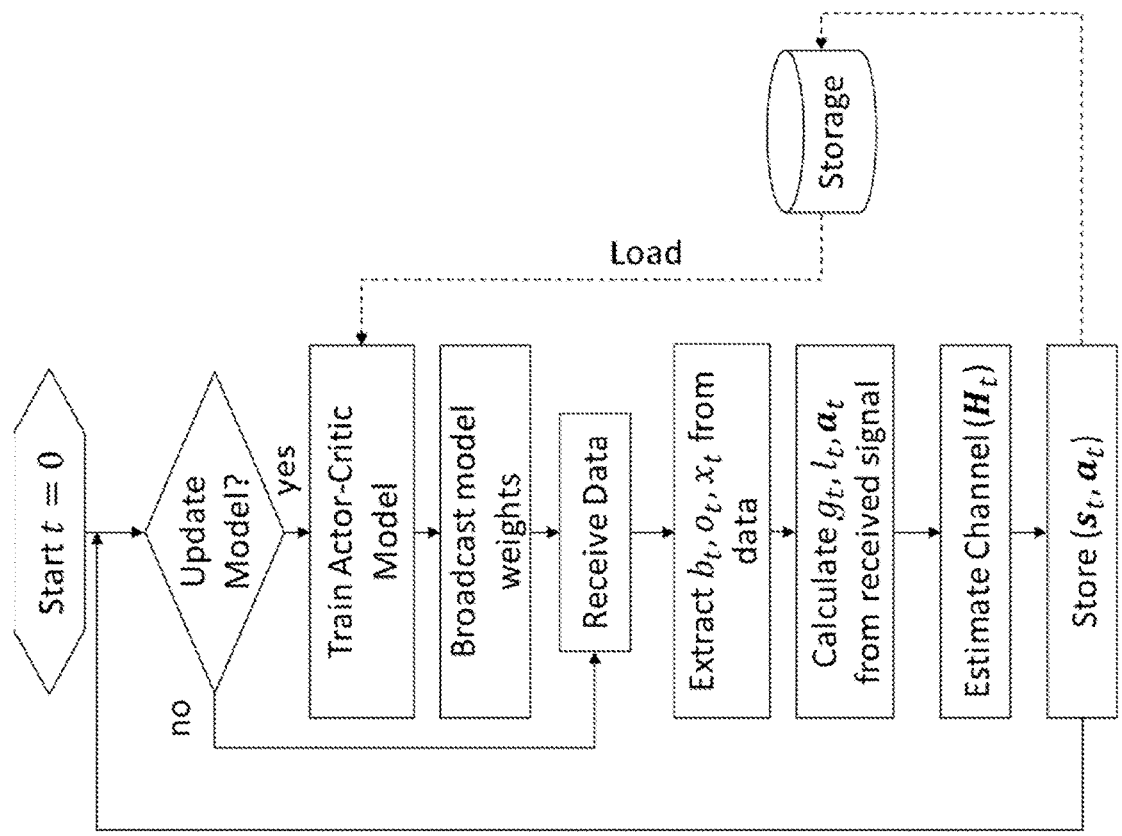
FIG. 7 is a flowchart of the cloud environment side of the method of FIG. 6.

FIG. 7 illustrates the procedure 600 is executed in the cloud. The cloud extracts data for the states of every single device and trains a full actor critic artificial neural network from this data. It then transmits the weights of the neural network to the devices through the broadcast channel. Therefore, each device has a copy of the neural network being trained from data collected by all the devices in the cloud.

Figure 8:
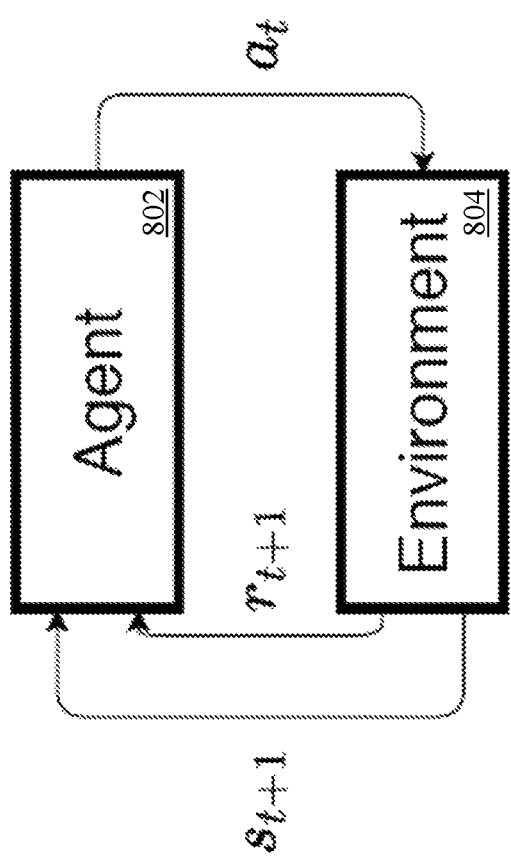
FIG. 8 is a schematic illustration of agent interactions with the environment in the reinforcement learning framework.
Figure 9:
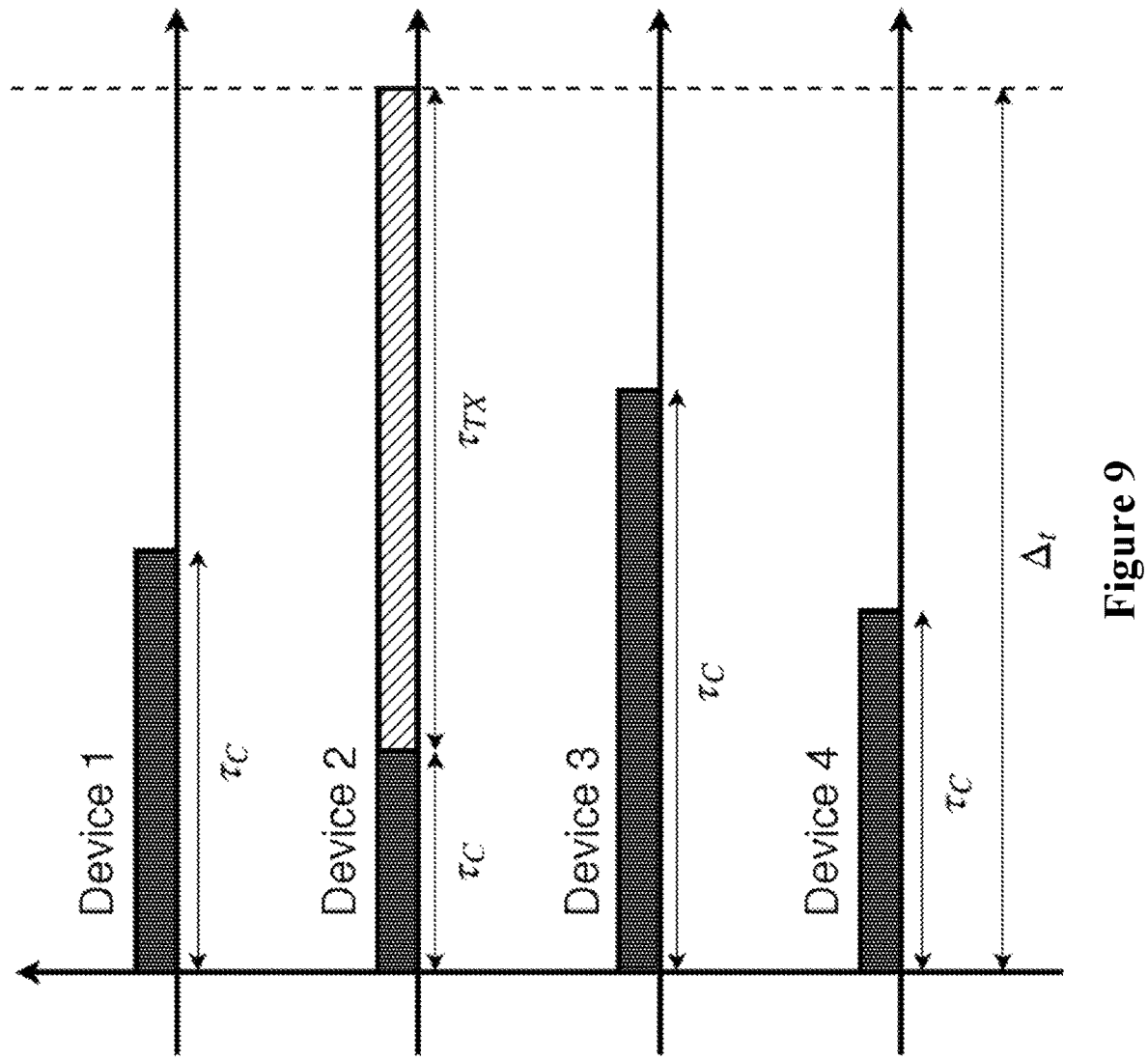
FIG. 9 is a diagram illustrating a considered CSMA/CA procedure for four devices sharing the same channel in which the grey shaded areas represent the random backoff listening time and the hashed area denotes the transmission time.
Figure 10:
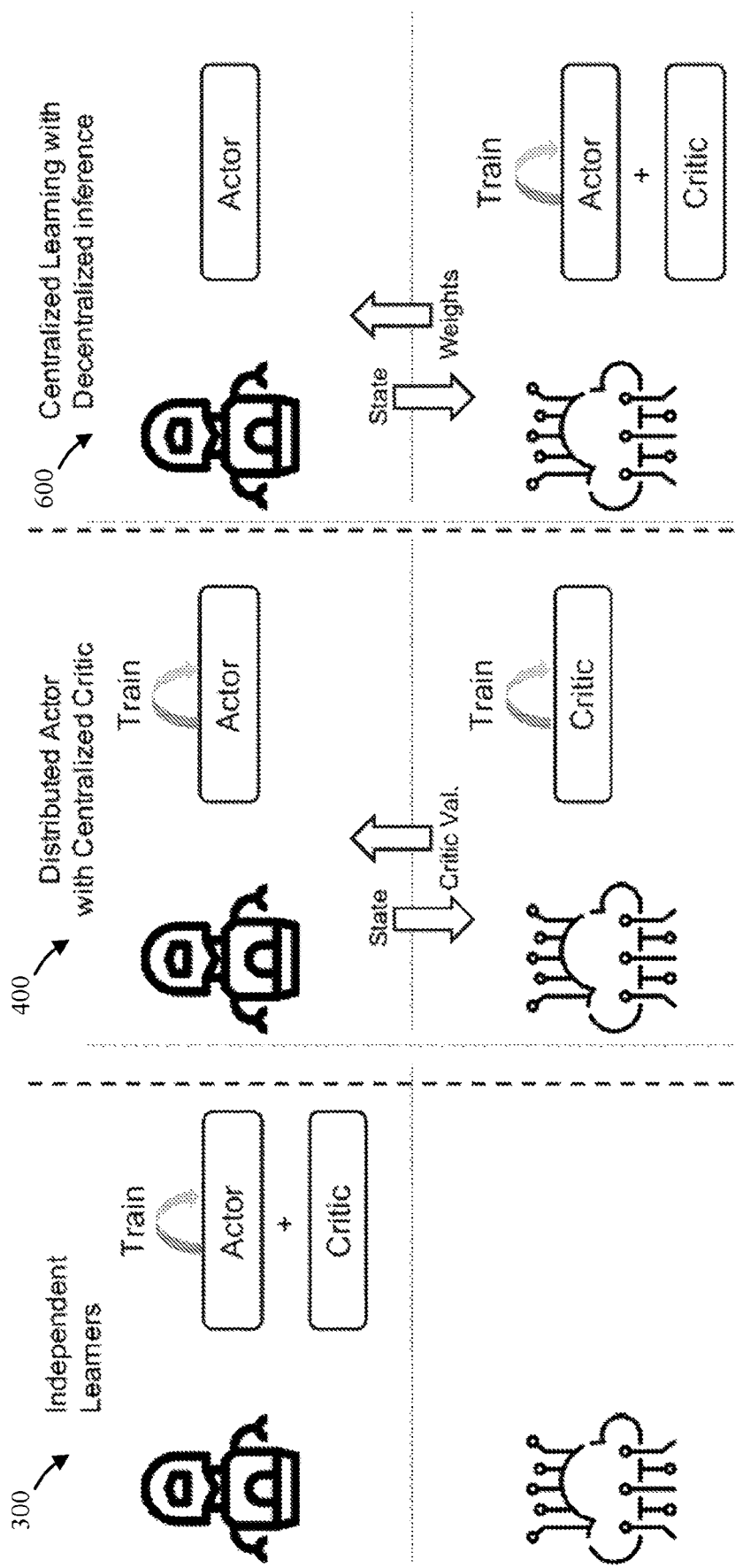
FIG. 10 is a schematic illustration of the differences between the three proposed architectures.

The below description in relation with FIGS. 8 to 10 is provided as a detailed example; as one way in which the methods, devices and apparatus described herein can be implemented. Implementation could differ and different elements could be substituted by variants having similar functions, as would be apparent to a person skilled in the art.

Hereinbelow, italic lowercase letters denote real and complex scalar values, and x* denotes the complex conjugate of x. Lower case boldface letters denote vectors, while upper case boldface denote matrices. A lowercase letter with one subscript, $x_i$, represents the i-th element of the vector x, while both $x_{i,j}$ and $[X]_{i,j}$ are used to denote the element on the i-th row and j-th column of matrix X. The operators $x^H$ and $X^H$ denote the hermitian conjugate of a vector and of a matrix, respectively. The operator E[•] denotes the expected value of a random variable. The function $\mathbb{P}$ (•) represents the probability of an event and x~$\mathcal{CN}$ (μ, K), where K∈$\mathbb{R}^n$, denotes that x is a complex Gaussian random vector, with mean μ and covariance matrix K. The notation x~U($\mathcal{X}$) denotes that x is drawn uniformly from the set $\mathcal{X}$. The sets $\mathbb{R}$, $\mathbb{C}$ and $\mathbb{B}$ are the sets of the real, complex and binary numbers, respectively. A calligraphic uppercase letter, such as $\mathcal{X}$, denotes a set and |$\mathcal{X}$| is its cardinality. The function ln(•) denotes the natural logarithm of its argument, while the function 1 (•) is the indicator function.

A system model is first introduced, considering a grant-free uplink cellular network where a set of $\mathcal{U}$ Machine Type Devices (MTDs), with |$\mathcal{U}$|=$N_U$, are transmitting to a base station (BS) belonging to the set $\mathcal{BS}$, such that |$\mathcal{BS}$|=$N_B$. It is assumed that each device connects to its closest BS and employs carrier sensing multiple access (CSMA) for congestion control. At the beginning of each transmission time interval (TTI) of duration $\Delta_t$, every device decides to go into transmit mode or idle mode to save power. If a device is in transmit mode, it selects a transmit power, one subcarrier from the set $\mathcal{SC}$, with |$\mathcal{SC}$|=$N_S$, and a modulation order from the set $\mathcal{M}$={1, . . . , M}. Then, it draws a random backoff time as a function of its modulation order. During the backoff time the device listens to the channel and if it doesn't sense any transmission during the backoff interval it transmits its packet in the rest of the TTI. At the end of the TTI, the MTDs who attempted to transmit data during this TTI receive an acknowledgement signal for the successfully transmitted packets. In the system model, it is hypothesized that the devices have already realized the attach procedure, have successfully connected and synchronized with the network, and that the relevant control information, such as TTI duration, modulation and coding scheme, supported transmit power values, available subcarriers, has been configured prior to data transmission. Moreover, to maintain the flexibility, the BS does not how many devices will be connecting beforehand. It is assumed that all transmissions are affected by multipath Rayleigh fading and additive white Gaussian noise (AWGN) with power $N_0$. It is assumed that the MTDs have perfect channel state information, and can always listen if the channel is empty, hence, ignoring the hidden terminal problem.

The Markov decision process (MDP) based framework is extended to a POSG to incorporate the nature of the distributed policy search in a cellular wireless network.

Referring to FIG. 8, in the reinforcement learning framework, the systems are described by temporal interactions between an agent 802 and an environment 804, where at each time slot the agent observes the current state of the environment at time slot t, denoted by $s_t \in \mathcal{S}$ and selects an action $\alpha_t \in \mathcal{A}$, where $\mathcal{S}$ is the set of states and $\mathcal{A}$ is the set of available actions. Depending on this action and the current state of the environment it receives a new state observation $s_{t+1} \in \mathcal{S}$ with probability $\mathbb{P}(s_{t+1}|s_t,\alpha_t)$, and the reward incurred by taking the action $a_t$ while at state $s_t$ is given by $r_{t+1}$ with conditional probability $\mathbb{P}(r_{t+1}|s_t,\alpha_t)$. Note that the future state and reward of the system depend only on the current state and action, making it an MDP. The block diagram in FIG. 8 illustrates this idea.

The goal of an agent is to learn a policy $\pi: \mathcal{S} \times \mathcal{A} \to [0,1]$ that maximizes its expected discounted rewards. A policy is nothing more than a conditional probability distribution of taking an action given the current state of the agent. The value function $V_\pi(s)$ quantifies how good it is for an agent to be at state s while following a policy π in terms of the discounted expected rewards, and is formally defined as $$V_\pi(s) \triangleq E_\pi\left[\sum_{k=0}^{\infty}\gamma^k r_{k+1}|s_0 = s\right] \forall s \in \mathcal{S}, \quad (1)$$

where γ∈(0,1] is the discount factor and determines how important are future rewards. Similarly, the action-value function $Q_\pi(s,\alpha)$ quantifies the value of taking action α while at state s and following policy π and is given by $$Q_\pi(s, a) \triangleq E_\pi\left[\sum_{k=0}^{\infty}\gamma^k r_{k+1}|s_0 = s, a_t = a\right] \forall s \in \mathcal{S}, \forall a \in \mathcal{A}. \quad (2)$$

It is possible to establish a partial ordering between different policies, where π≥π' if and only if $V_\pi(s) \geq V_{\pi'}(s)$ for all s∈$\mathcal{S}$. Hence, for an optimal policy $\pi_*$, we must have $$V_*(s) \triangleq \max_\pi V_\pi(s) \forall s \in \mathcal{S}, \quad (3)$$

$$Q_*(s, a) \triangleq \max_\pi Q_\pi(s, a) \forall s \in \mathcal{S} \text{ and } \forall a \in \mathcal{A}. \quad (4)$$

When the transition probabilities $\mathbb{P}(s'|s,\alpha)\forall s, s'\in \mathcal{S}$ and $\alpha \in \mathcal{A}$ and the rewards distribution $\mathbb{P}(r|s,\alpha)\forall s\in \mathcal{S}$ and $\alpha \in \mathcal{A}$ are known, an optimal policy can be found via dynamic programming. However, in many problems these probabilities are unknown to the agents or the state and action sets are too large, rendering dynamic programming infeasible.

A Partially Observable Stochastic Game (POSG), models how multiple agents with distinct and possibly adversarial goals interact with a stochastically changing environment in discrete time slots. At each time slot, the agents receive a partial, and possibly noisy, observation of the environment and select an action to take in the next slot based on this observation. Each action incurs in a reward and the objective of the agents is to learn a policy that maximizes its rewards. Herein, we are concerned with infinite horizon POSGs. The POSG problem is formally defined by a tuple ($\mathcal{U}$, $\mathcal{S}$, $\mathcal{A}$, $\mathcal{P}_s$, $\mathcal{R}$, $\mathcal{O}$), where $\mathcal{U}$ is a set with $N_u$ agents. $\mathcal{S}$ and $\mathcal{A} = \times_{i\in\mathcal{U}} \mathcal{A}_i$ are the state space of the system and the joint action space, where $\mathcal{A}_i$ is the action space of agent i. The state-action transition probability $\mathcal{P}_s: \mathcal{S}\times\mathcal{A}\times\mathcal{S} \to [0,1]$ gives the probability of transitioning to a state, given the current state and the joint selected action. Furthermore, $\mathcal{R}=\{r_i|r_i:\mathcal{S}\times\mathcal{A}\to\mathbb{R} \; \forall i\in \mathcal{U}\}$ is the set of reward functions, where $r_i$ denotes the reward function of agent i. The set $\mathcal{O}=\{\mathcal{O}_i:\mathcal{O}_i\subseteq\mathcal{S}\;\forall i\in \mathcal{U}\}$ contains the observation space of each device, which is a subset of the complete state space. The state of the environment and the joint selected action at time slot t are denoted by $s_t\in\mathcal{S}$ and $a_t\in\mathcal{A}$, respectively.

In the network model, each TTI consists of a POSG time slot. It is considered that the state of the network at time slot t is given by the tuple $s_t=(b_t,\{H_t^i\}_{i=1}^{N_u},x_t)$. The vector $b_t\in\mathcal{B}^{N_u}$, where $\mathcal{B}=\{1, 2, \ldots, B\}$ and B is the packet buffer length, denotes the number of packets queued in the buffer.

The matrix $H_t^i\in\mathbb{C}^{N_b\times N_s}$ denotes the complex channel between the i-th MTD and the BSs on each subcarrier, where $[H_t^i]_{k,j}$ is the channel between BS k and device i on subcarrier j. The vector $x_t\in\{1, 0\}^{N_u}$ designates the dynamic power management state of MTDs. If $[x_t]_i=1$ the device's radio is turned on and consumes $P_{ON}$ watts, while if $[x_t]_i=0$ the device's radio is idle and consumes $P_{IDLE}<P_{ON}$, however it cannot transmit data in the idle mode. This allows for devices to save power by deferring transmission when faced with poor channel conditions or if there are no backlogged packets in its buffer. Additionally, let $d_{i,k}$ be the distance between device i and BS k. It is assumed that the i-th device associates with the geographically closest bs denoted by BS(i), therefore $$BS(i)=k \text{ iff } d_{i,k}\leq d_{i,k'} \forall k'\in\{1,\ldots,N_b\} \quad (5)$$

The devices only have information about their local state. Therefore, the observation tuple of device i at time slot t is given by $o_t^i=(b_t^i, H_t^i, x_t^i)$.

At the beginning of each TTI, the i-th device observes the tuple $o_t^i$ and selects an action tuple $a_t^i=(p_t^i,\beta_t^i,\theta_t^i,y_t^i)$, where $p_t^i\in\mathcal{P}$ is the transmit power and $\mathcal{P}$ is the set of transmit powers, $\theta_t^i\in\mathcal{SC}$ is the subcarrier to transmit, $\beta_t^i\in\{1,\ldots,M\}$ is the modulation order and M is the maximum modulation order, and $y_t^i\in\{1, 0\}$ indicates whether to transition to the transmit or idle mode, respectively, of user i at time slot t.

In the model, the joint actions and the state of the environment are represented by tuples of state and action vectors. However, not all actions from the tuple affect the transition of all states. For instance, the channel gain at time slot t+1 does not depend on the transmit power $p_t^i$ of device i at time slot t. Therefore, the transition probability function can be decomposed as $$\mathcal{P}_s(s_t,a_t,s_{t+1})= \mathbb{P}(b_{t+1}|b_t,\{H_t^i\}_{i=0}^{N_u},x_t,p_t,\beta_t,\theta_t) \\ \mathbb{P}(\{H_{t+1}^i\}_{i=0}^{N_u}|\{H_t^i\}^{N_u}) \mathbb{P}(x_{t+1}|x_t,y_t). \quad (6)$$

The procedures involved in the action selection, and the analysis of the transition probabilities shown in (6) are discussed below.

It is considered that all MTDS employ a rate adaptive CSMA as a MAC protocol on each individual subcarrier. A time slot is divided into two phases: contention and transmission. During the contention phase the devices listen to the channel on a specific subcarrier for a random backoff time $\tau_C<\Delta_t$. If no other user has started transmission during this time, the device starts its transmission for an amount of time $\tau_{TX}=\Delta_t-\tau_C$. The protocol is illustrated in FIG. 9, where a situation where four devices are transmitting in the same subcarrier is shown. The grey shaded areas indicate the random backoff time $\tau_C$ drawn by each user. In this figure, as the device 2 drew the smallest backoff time, it takes hold of the channel and transmits its data in the remaining time available in the time slot. In this model, a collision occurs if two devices draw the same random backoff time.

A same rate adaptive CSMA protocol is considered, where a congestion window (cw) given by $CW_{min}(\beta_t^i)=\lfloor A2^{M-\beta_t^i}\rfloor$, where $A\in\mathbb{R}$ is a design parameter, are assigned to the devices according to their modulation order. The backoff time of the i-th device $\tau_c^i$ is uniformly chosen from $[0, CW_{min}(\beta_t^i)]$ and is reseted at the end of the time slot. If a collision occurs, the devices' CW are set to $CW_{max}=A2^{\beta_{max}}$. Note that $$z_t^i = \left\lfloor \frac{\beta_t^i \tau_{TX}}{LT_S} \right\rfloor$$

packets are transmitted by user i in a given TTI. This approach increases the likelihood that a device that intends to transmit at higher rates obtains channel access, avoiding anomaly where low-rate users can significantly degrade the performance of the whole network.

Now, let $\mathcal{BS}_k=\{i:BS(i)=k\}$ and $\mathcal{SC}_j=\{i:\theta_i^t=j \text{ and } x_t^i=1\}$ be the sets of MTDs associated to BS k, and MTDs trying to transmit on subcarrier j on time slot t, respectively. Finally, let $\Omega_t^{i,j,k}=\tau_C^i\leq\tau_C^u \forall u\in\mathcal{BS}_k\cap\mathcal{SC}_j$ be the event that device i obtains transmit access to bs k, on subcarrier j, at time slot t.

In this work, it is assumed that all devices transmit symbols from a M-quadrature amplitude modulation (QAM) with fixed duration T s and that all the packets are L bits long. At each time slot, the devices select a modulation order and a transmit power from the finite sets $\mathcal{M}=\{1,\ldots,M\}$ and $\mathcal{P}=\{\rho_1,\rho_2,\ldots,\rho_{max}\}$ dBm, respectively. The modulation order and the transmit power affect the probability of transmitting a packet successfully, the interference levels of the network and the cost associated with each transmission.

How each of the elements in the state tuple $s_t=(b_t,\{H_t^i\}_{i=0}^{N_u},x_t)$ evolve through time as a result of the interaction with the MTDs and from the random characteristics of the environment will now be presented.

Wireless Channel: The channel gain between MTD i and BS k on subcarrier j at time slot t is given by $$[H_t^i]_{j,k} = |h_t^{i,j,k}|^2 d_{i,j}^{-\zeta}, \quad (7)$$

where $\zeta$ is the path loss exponent, and $h_t^{i,j,k}$ is the small-scale fading. It is assumed that the channel gains are constant during the TTI duration. A first-order Gauss-Markov small-scale flat fading model is considered $$h_t^{i,j,k} = \kappa h_{t-1}^{i,j,k} + n_t^{i,j,k}, \quad (8)$$

where the innovation $n_t^{i,j,k} \sim \mathcal{CN}(0, 1-\rho^2)$. "Innovation" is defined as the difference between the observed value of a variable at time t and the optimal forecast of that value based on information available prior to time t. The correlation between successive fading components is given by $$\kappa = J_0(2\pi f_{max} T_s), \quad (9)$$

where $f_{max}$ is the maximum Doppler frequency and $J_0$ is the zero-th order Bessel function.

Buffer State and Traffic Model: The buffer state $b_t$ represents the number of packets queued for transmission at each MTD at time slot t. At each time slot $l_t$ new packets arrive and $g_t$ packets depart from the buffer. Therefore, the current number of packets in the buffer is given by $$b_t = \min(\max(b_{t-1} - g_{t-1}, 0) + l_t, B). \quad (10)$$

It is assumed that the number of packets arriving at each device is independent of the actions taken and is independent identically distributed (i.i.d.). The number of arrivals at each time slot is modeled as a Poisson random process with distribution $$\mathbb{P}(l_t^i = n) = \frac{\lambda_i}{n!} e^{-\lambda_i}, \quad (11)$$

where $\lambda_i$ is the mean packet arrival rate of device i.

The goodput $g_t$, defined as being the number of information successfully transmitted to a destination per unit of time, has a more complex relationship with the actions taken at the current time slot. It depends whether or not the user is able to take hold of the channel, on the interference from other users, on its transmit power and modulation order and on its channel's quality. Some auxiliary variables and sets are introduced and the goodput's conditional probability distribution is then derived. Firstly, let $\mathcal{J}_t^{(j)} = \{i : 1(\Omega_t^{i,j,k}) = 1 \forall i, k\}$ be the set of users scheduled to transmit at subcarrier j at time slot t. The goodput of the i-th MTD is a function of the device's transmit power, its selected subcarrier, its channel to the receiving BS, and the interference power at the receiving BS. The probability of decoding a bit in error (denoted as $P_e^i$) can be approximated by $$P_e^i \approx \begin{cases} \frac{1}{2} \operatorname{erfc}\left\{\sqrt{\frac{p_t^i h_t^{i,\theta_t^i, BS(i)}}{I_t^i + N_0}}\right\} & \text{if } \beta_t^i = 1 \\ 2 \operatorname{erfc}\left\{\sqrt{\frac{3 \log_2(\beta_t^i) p_t^i h_t^{i,\theta_t^i, BS(i)}}{2(\beta_t^i - 1)(I_t^i + N_0)}}\right\} & \text{if } \beta_t^i > 1, \end{cases} \quad (12)$$

where $l_t^i$ is the interference experienced by device's i transmission, and is given by $$I_t^i = \sum_{u \in \mathcal{J}_t^{\theta_t^i} \setminus \{i\}} h_t^{u, \theta_t^i, BS(i)} p_t^u. \quad (13)$$

With the approximate probability of decoding a bit in error given by (12), the probability of losing a packet is obtained as $$P_{loss}^i = 1 - (1 - P_e^i)^L. \quad (14)$$

Finally, the conditional probability distribution of the goodput is given by $$\mathbb{P}(g_t^i = n | \beta_t^i, p_t, \{H_t^i\}_{i=1}^{N_u}, \theta_t^i) = \begin{cases} (P_{loss}^i)^{z_t^i} \mathbb{P}(\Omega_t^{i,\theta_t^i, BS(i)}) + \left(1 - \mathbb{P}(\Omega_t^{i,\theta_t^i, BS(i)})\right) & \text{if } n = 0, \\ \binom{z_t^i}{n}(1 - P_{loss}^i)^n (P_{loss}^i)^{z_t^i - n} \mathbb{P}(\Omega_t^{i,\theta_t^i, BS(i)}) & \text{if } 0 < n \leq z_t^i, \\ 0 & \text{otherwise}. \end{cases} \quad (15)$$

Now, based on (10), (11) and (15) the sequence of states $\{b_t\}_{t=0}^{\infty}$ is modeled as controlled Markov chain with transition probability $$\mathbb{P}(b_{t+1}^i | \beta_t^i, p_t, \theta_t, b_t^i, x_t^i, \{H_t^i\}_{i=1}^{N_u}) = \begin{cases} \sum_{g=0}^{z_t^i} (P_l(b_{t+1}^i - b_t^i + g) P_g(g)) & \text{if } b_{t+1}^i < B \\ \sum_{g=0}^{z_t^i} \sum_{l=B-(b_t^i-g)}^{\infty} (P_l(l) P_g(g)) & \text{if } b_{t+1}^i = B, \end{cases} \quad (16)$$

where $P_l(l) = \mathbb{P}(l_t^i = l)$, and $P_g(g) = \mathbb{P}(g_t^i = g | \beta_t^i, p_t, \{H_t^i\}_{i=1}^{N_u}, \theta_t^i)$.

Moreover, one goal is to reduce the probability of overflown packets, i.e. packets that arrive while the buffer is full. The number of overflown packets at device's i buffer is given by $$\xi_t^i = \max(b_t^i + l_t^i - g_t^i - B, 0). \quad (17)$$

Dynamic Power Management: In the system under consideration, at each time slot the devices have a stochastic number of packets arriving to be transmitted over a stochastic wireless channel. Therefore, at some situations, when there is little or no packets at the queue or during poor channel conditions, not transmitting any data may be the optimal approach to save power. In order to take advantage of this, it is assumed that each device is able to select a power state mode between:

Transmission Mode: The radio is turned on, and the device tries to transmit in one of the subcarriers. During this mode the device consumes $P_{ON}$ plus its transmission power if it succeeds to access the channel.

Idle Mode: The radio is turned off and the radio does not transmit any packets. During this mode the device consumes $P_{IDLE} < P_{ON}$ watts of power.

There is an inherit delay in switching between different modes, so the dynamic power management state of the device i at time slot t is modeled as a Markov chain with transition probability $$\mathbb{P}(x_t^i | x_{t-1}^i, y_{t-1}^i = 1) = \begin{cases} 1 & \text{if } x_{t-1}^i = x_t^i = 1, \\ \omega & \text{if } x_{t-1}^i = 0, x_t^i = 1, \\ 1 - \omega & \text{if } x_{t-1}^i = x_t^i = 0, \\ 0 & \text{otherwise,} \end{cases} \quad (18)$$

$$\mathbb{P}(x_t^i | x_{t-1}^i, y_{t-1}^i = 0) = \begin{cases} 1 & \text{if } x_{t-1}^i = x_t^i = 0, \\ \omega & \text{if } x_{t-1}^i = 1, x_t^i = 0, \\ 1 - \omega & \text{if } x_{t-1}^i = x_t^i = 1, \\ 0 & \text{otherwise,} \end{cases} \quad (19)$$

where $0 \leq \omega \leq 1$ is the probability of switching between power states in time for the next TTI. It is assumed that $\omega = 0$ without loss of generality.

In a POSG, each device aims to find a stochastic policy $\pi_i \in \Pi_i$, where $\Pi_i = \{\pi | \pi : \mathcal{O}_i \times \mathcal{A}_i \to [0,1]\}$ is the set of all possible policies for MTD i, that minimizes its infinite-horizon cost function non-cooperatively. One goal in the proposed scenario is to minimize the average discounted expected transmit power subject to a constraint on the discounted expected delay costs, resulting in a constrained Markov decision process (cmdp). Mathematically this can be expressed as $$\min_{\pi \in \Pi} \; E_i[P^{\pi_i}(o)] \quad \text{s.t.} \quad D^{\pi_i}(o) \leq \delta_i \; \forall \, o \in \mathcal{O}_i, \forall \, i, \quad (20)$$

where $\pi = [\pi_1, \ldots, \pi_{N_U}]$ and $\Pi = \Pi_1 \times \ldots \times \Pi_{N_U}$, $P^{\pi_i}(o)$ is the discounted expected power cost of device i under policy $\pi_i$, $\delta_i$ is the delay constraint of device i, and $D^{\pi_i}(o)$ is the discounted expected delay cost.

Power cost: At each time slot, the i-th device incurs in an instantaneous power cost of $$c_p^i(o_t^i, a_t^i) = \begin{cases} \frac{1}{P_{ON}}\left(P_{ON} + \frac{\tau_{TX}}{\Delta_t} p_t^i\right) & \text{if } x_t^i = 1 \text{ and } \mathbb{1}\left(\Omega_t^{i, \theta_t^i, BS(i)}\right) \\ 1 & \text{if } x_t^i = 1 \text{ and } \mathbb{1}(\overline{\Omega}_t^{i, \theta_t^i, BS(i)}) \\ \frac{P_{IDLE}}{P_{ON}} & \text{if } x_t^i = 0 \end{cases} \quad (21)$$

Note that the power cost by the $P_{ON}$ is normalized. This normalization is important for the stability of the algorithms discussed further below. Therefore, its discounted expected power cost is given by $$P^{\pi_i}(o) = E_{a \sim \pi_i}\left[\sum_{k=t}^{\infty} \gamma^k c_p^i(o_k^i, a) \Big| o_t^i = o\right] \forall \, o \in \mathcal{O}_i. \quad (22)$$

Delay Cost: According to Little's theorem, the average number of packets queued in the buffer is proportional to the average packet delay in queues with stable buffers (i.e., no overflow). Hence, the delay cost is designed to discourage large number of packets in the queue, which is referred to as the holding cost, while simultaneously penalizing dropped packets, which is referred to as the overflow cost. The instantaneous delay cost at time t is defined as $$c_d^i(o_t^i, a_t^i) = \frac{1}{B}\left[(b_t^i - g_t^i) + \mu \xi_t^i\right], \quad (23)$$

where $\mu$ is the overflow penalty factor. Hence, the infinite-horizon discounted expected delay cost is given by $$D^{\pi_i}(o) = E_{a \sim \pi_i}\left[\sum_{k=t}^{\infty} \gamma^k c_d^i(o_k^i, a) \Big| o_t^i = o\right] \forall \, o \in \mathcal{O}_i. \quad (24)$$

The penalty factor is chosen such that it ensures dropping packets is suboptimal while encouraging devices to transmit with low power when advantageous. To meet these requirements, a value of $\mu$ is chosen such that dropping a packet costs as much as the largest possible discounted expected cost incurred by holding a packet in the buffer, which happens if the packet is held in the buffer forever. Therefore $$\mu = \sum_{t=0}^{\infty} \gamma^{t+1} = \frac{\gamma}{1 - \gamma}. \quad (25)$$

To deal with the problem of dynamic channel, power and modulation selection under delay constraints described previously, three different distributed learning architectures are proposed: independent learners (IL), distributed actors with centralized critic (DACC) and centralized learning with decentralized inference (CLDI).

FIG. 10 illustrates the main differences between these architectures. Firstly, in the Independent Learners architecture 300, each MTD has its own network for policy selection (the actor) and value estimation (the critic). Secondly, in the Distributed Actor Central Critic 400, the value estimator and policy selection networks are decoupled. Each MTD has its own policy selection network and a cloud agent, which is assumed to be connected to every BS and has access to the state of every MTD stores and trains a value estimator network. At each TTI, the cloud agent feedbacks the critic value of the current state to all MTDs through a broadcast channel. MTDs use the feedback value estimate as a baseline to train their policy selection network. Finally, in the Centralized Learning Decentralized Inference 600 architecture, it is considered that the cloud agent trains the weights (only from local observations) of a single policy network that are shared by all agents and feedbacks them periodically through a broadcast channel. Then, MTDs are able to select their actions only from local observations. Each different approach presents its own advantages and challenges, as detailed below.

Finally, the three architectures are compared with a baseline employing power ramping and random transmission probability to avoid congestion.

In order to provide a fair comparison, in all of the proposed architectures an actor-critic style PPO algorithm is considered, due to its ease of implementation, the possibility of decoupling the policy and the value estimator, reduced sample complexity in comparison with trust region policy optimization (TRPO) and first-order updates. Furthermore, it is considered that each agent employs an artificial neural network (ANN) to model the policy and as a value estimator.

In contrast to action-value methods, such as Q-learning, where the agent learns an action-value function and uses it to selection actions that maximize its output, policy gradient methods learn a parametrized policy that selects the actions without consulting a value function. Let $w \in \mathbb{R}^d$ be the policy parameter vector, then the parametrized policy $\pi_w(a|s) = \mathbb{P}(a_t=a|s_t=s, w_t=w)$ denotes the probability of selecting action a, while at state s with policy parameter w during the time slot t.

In order to learn the policy parameter, a scalar performance function J(w), differentiable with respect to w is considered. Then, the learning procedure consists of maximizing J(w) through gradient ascent updates of the form $$w_{t+1} = w_t + \alpha \nabla_w \tilde{J}(w_t), \quad (26)$$

where $\alpha$ is the learning rate, and $\nabla_w \tilde{J}(w_t)$ is an estimator of the gradient of the performance measure. A common choice of performance measure is $$J(w) = \pi_w(a_t|s_t) A(s_t, a_t), \quad (27)$$

where $A(s_t,a_t) = Q(s_t,a_t) - V(s_t)$ is the advantage function, which gives the advantage of taking action $a_t$ in comparison to the average action. The name actor-critic comes from (27), as the difference between the actor estimate ($Q(s_t,a_t)$) and the critic estimate ($V(s_t)$) is evaluated. The gradient of the performance measure can be estimated by taking the average gradient over a finite batch of time slots $\mathcal{T}$ as $$\begin{aligned} \nabla_w \tilde{J}(w) &= \frac{1}{|\mathcal{T}|} \nabla_w (\sum_{t \in \mathcal{T}} \pi_w(a_t|s_t) A(s_t, a_t)) \\ &= \frac{1}{|\mathcal{T}|} \sum_{t \in \mathcal{T}} \nabla_w \pi_w(a_t|s_t) A(s_t, a_t) \\ &\stackrel{(a)}{=} \frac{1}{|\mathcal{T}|} \sum_{t \in \mathcal{T}} \pi_w(a|s) \nabla_w \ln \pi_w(a_t|s_t) A(s_t, a_t) \\ &= \hat{E}_{\mathcal{T} \sim \pi_w}[\nabla_w \ln \pi_w(a_t|s_t) A(s_t, a_t)] \end{aligned} \quad (28)$$

where $\hat{E}_{\mathcal{T} \sim \pi_w}$ denotes an empirical average of the finite batch of state action tuples $\mathcal{T}$, while sampling the actions from policy $\pi_w(a|s)$. Moreover, equality (a) is obtained from the identity $$\pi_w(a|s) \nabla_w \ln \pi_w(a|s) = \pi_w(a|s) \frac{\nabla_w \pi_w(a|s)}{\pi_w(a|s)} = \nabla_w \pi_w(a|s). \quad (29)$$

The Proximal Policy Optimization (PPO) algorithm consists of maximizing a clipped surrogate objective $J^{clip}(w)$ instead of the original performance measure J(w), therefore avoiding the destructively large updates experienced on policy gradient methods without clipping. The surrogate objective is defined as $$J^{clip}(w) = \hat{E}_{\mathcal{T} \sim \pi_w}[\min(\Gamma_t(w)A(s_t,a_t), \text{clip}(\Gamma_t(w), 1-\epsilon, 1+\epsilon)A(s_t,a_t))] \quad (30)$$

where $$\Gamma_t(w) = \frac{\pi_w(a_t|s_t)}{\pi_{w_{old}}(a_t|s_t)}$$

is the importance weight, $\epsilon$ is a hyperparameter that controls the clipping, and $w_{old}$ are the policy weights prior to the update. Due to the term clip($\Gamma_t(w)A(s_t,a_t), 1-\epsilon, 1+\epsilon$), the importance weight is clipped between $1-\epsilon$ and $1+\epsilon$, minimizing the incentives for large destabilizing updates. Furthermore, by taking the minimum of the clipped and unclipped functions, the resulting surrogate objective is a lower bound first-order approximation of the unclipped objective around $w_{old}$.

Furthermore, the performance measured is augmented to include a value function loss term, corresponding to the critic output, given by $$J^{VF}(w) = \hat{E}_{\mathcal{T} \sim \pi_w}\left[\left(V_{\pi_w}(s_t) - \sum_{k=0}^{t-1} \gamma^k r_t\right)^2\right]. \quad (31)$$

Finally, a final term of entropy bonus $H(\pi_w)$ is added to encourage exploration of the state space. The final surrogate objective function to be maximized is given by $$J^{surr}(w) = J^{clip}(w) - k_1 J^{VF}(w) + k_2 H(\pi_w), \quad (32)$$

where $k_1$ and $k_2$ are system hyperparameters. The PPO algorithm is summarized in Algorithm 1, 1100, FIG. 11.

In the IL architecture, each device has its own set of weights $w^i$ and is running its own learning algorithm to update their weights and they do not share any information about their policies or current and previous states. As each device has only a local view of the state of the environment, they cannot learn a policy to solve the optimization problem in (20). Instead, the i-th device searches for a policy to solve its own local problem. Therefore, each agent solves the problem given by $$\min_{\pi_i \in \Pi_i} P^{\pi_i}(o) \quad \text{s.t.} \quad D^{\pi_i}(o) \leq \delta_i. \quad (33)$$

In this architecture, each agent changes its policy independently of one another, but their actions affect the rewards experienced by other agents, therefore, agents perceive the environment as non-stationary.

Moreover, the problem posed as a constrained optimization one can be reformulated as an unconstrained problem by including a Lagrangian multiplier $\Lambda \geq 0$, corresponding to the delay cost constraint, resulting in the reward function $$r_t^i(s_t, a_t) = -(c_p^i(o_p^i, a_p^i) + \Lambda_t^i c_d^i(o_t^i, a_t^i)), \quad (34)$$

In addition, the observation value function $V_{\pi_i}(o_t)$ is introduced, as the value of an observation in terms of the discounted expected cost of observing o while following the policy $\pi_i$, and is given by $$V_{\pi_i}(o) \stackrel{\Delta}{=} E_{a \sim \pi_i}\left[\sum_{k=t}^{\infty} \gamma^k r_k^i(o_k^i, a) \mid o_t^i = o\right] \forall o \in \mathcal{O}_i. \quad (35)$$

Analogously, the action-observation value function is defined as the value of taking action a, while observing o and following policy $\pi_i$ as $$Q_{\pi_i}(o, a) \stackrel{\Delta}{=} E_{a' \sim \pi_i}\left[\sum_{k=t}^{\infty} \gamma^k r_k^i(o_k^i, a') \mid o_t^i = o, a_t = a\right] \forall o \in \mathcal{O}_i. \quad (36)$$

To summarize, in the fully distributed architecture, each device runs Algorithm 1 independently using (35) and (36), where each device seeks to minimize its local expected discounted costs. As shown in FIG. 10, the main advantage of this approach is that it does not require any form of communications between devices nor between a device and the BS. On the other hand, it requires every device to have its own set of weights and to run its own learning algorithm, which can result in a high computational power consumption. Also, as each agent face a non-stationary environment, there are no guarantees of convergence to an equilibrium solution.

The PPO algorithm makes use of two networks, the actor that models the agent's policy, and the critic that estimates the value of a state. Originally, the algorithm proposes that both networks can share weights to accelerate convergence and reduce memory costs, however, due to the nature of the problem considered herein, an architecture is proposed where each agent stores its own actor network, while a single critic network is stored in the cloud by the network operator. The goal of this architecture is to mitigate the effects of the partial observation by having a critic who has access to data of every agent (the whole state) to estimate the state value. Despite having access to the whole state information, it is considered that the value estimator at the central agent only makes use of the aggregate local information of each MTD, as in the scenario considered herein, the number of MTDs is not known beforehand. At the same time, the agents just need information about their own observations to take actions.

Hence, in this architecture, the surrogate objective function in (32) is split in two, one to be minimized by the agents to train the actor network, given by $$J_a^{surr}(w) = J^{clip}(w) + k_2 H(\pi_w), \quad (37)$$

and another one to be minimized in the cloud to train the critic network, given by $$J_c^{surr}(w) = J^{VF}(w). \quad (38)$$

Additionally, $J^{VF}(w)$ is maximized over data collected from all agents, by calculating the global value function as $$V_\pi(s_t) \triangleq E_{a \sim \pi}\left[\sum_{k=t}^{\infty} \frac{1}{N_u} \sum_{i=1}^{N_u} \gamma^k r_k^i(o_k^i, a^i) | s_t = s\right] \forall s \in \mathcal{S}. \quad (39)$$

Furthermore, as illustrated in FIG. 10, each agent keeps its own set of weights $w^i$ for the actor network, while the weights of the value function estimator $w^{VF}$ are stored at the central agent. Additionally, both the MTDs and the central agent have to perform backpropagation to update their weights. While each MTD has access to its own local information, the value estimator trained on the central agent can leverage the data collected by all agents, thus, the central agent is able to backpropagate on the global state information, minimizing (20).

Moreover, this architecture requires the BSs to feedback the value of each state after every TTI, so, the agents can perform backpropagation and train their actor networks.

As the number of MTDs in the network increases, the size of the policy search space Π increases exponentially making it less likely for the system to convert to an equilibrium where the MTDs satisfy their delay constraints. To address this issue, in the CLDI architecture, there is a single set of weights, therefore a single policy π and a search space Π that does not increase in size with the number of MTDs. The policy is trained in the cloud and is periodically broadcast to the MTDs in the network, also reducing the computational burden on the devices required to train a neural network.

Moreover, the cloud collects data from all MTDs enabling faster convergence. Hence, instead of solving (20), the CLDI architecture looks for solutions to $$\min_{\pi \in \Pi} E_i[P_i^\pi(o)] \quad \text{s.t.} \quad D_i^\pi(o) \leq \delta_i \quad \forall i \in \mathcal{U}. \quad (40)$$

So, in order to solve (40), the PPO algorithm maximizing the average reward over the whole network is used.

The performance of the proposed architectures is evaluated through computer simulation and compared for two different scenarios. It is considered that there are two BSs and eight subcarriers serving a circular area with 300 m radius. One thousand realizations of this scenario are generated, and at each realization both the WAPs and the MTDs are placed in a random location within the circular area. On each realization the learning algorithms start from scratch (e.g., the weights of the agents are randomly initialized at the beginning of each realization) and runs for fifteen thousand TTI. Then, the average performances are compared, along with their variances, with respect to the average delay experienced by the network, the number of dropped packets, the average power spent and the number of collisions.

In order to provide a frame of reference, the performance of a simple baseline distributed algorithm is also simulated, for comparison.

| Parameters used in the simulations | |
|---|---|
| Parameter | Value |
| $f_S$ | $10^5$ symbols/s |
| $N_U$ | {40, 120} users |
| $N_B$ | 2 BS |
| $N_S$ | 8 subcarriers |
| η | 2.5 |
| B | 25 packets |
| L | 10 bytes |
| $\Delta_t$ | 10 ms |
| $\delta_i$ | U({4, 8, 12}) packets |
| $\lambda_i$ | U({40, 60, 80}) packets/s |
| γ | 0.99 |
| $P_{ON}$ | 320 milliwatts |
| $P_{OFF}$ | 0 milliwatts |
| $f_{max}$ | 10 Hz |
| ANN updates every | 200 TTI |

The baseline and the architectures described previously are then compared in terms of the average network delay, power, dropped packets and collisions during fifteen thousand TTIs. The network delay is evaluated through the holding cost, as the average network delay is proportional to the number of packets held in the devices' buffer.

What follows is noted from the simulations. With 40 users, the average holding cost between all four approaches is roughly the same, however, the baseline presents a significantly higher variance than the proposed architectures.

Furthermore, the average network delay is below four, which is the smallest constraint in the network, within at least one standard deviation. With respect to overflown packets, the baseline approach drops on average slightly more packets than the proposed architectures, but again with significantly more variance. With respect to the power consumption, the three proposed architectures spend on average roughly 70% of the power spent by the baseline. Moreover, as mentioned previously, the CLDI algorithm tends to converge faster as it is trained on observations from every device in the network and it has to search for a policy in a notably small policy search space. However, for this same reason, in the best-case scenario it only finds a sub-optimal solution. This is confirmed by the fact that as the simulation advances in time and the IL and DACC algorithm train on more data, they achieve similar levels of performance to CLDI, while using less power. The performance improvement of the proposed architectures, in comparison to the baseline, is even more noticeable when it comes to the number of collisions. The reinforcement learning based solutions experience on average 15% of the baseline's collisions during the same period of time.

When the number of users is increased to 120, the average holding cost of the CLDI architecture converges to 2 packets, while the IL and DACC converge to 8 packets and the baseline to 12 packets. From this result, it can be concluded that as the number of users increase the lack of collaboration between the MTDs in the IL and DACC architectures start to impact the average network delay, while CLDI performance stays around the same as for 40 users. Also, the average overflow cost of CLDI still remain around 0, while the IL and DACC stabilizes around 0.7 and the baseline $a_f$ 0.19. With regards to the average power costs $a_f$ convergence, the CLDI architecture spends 16.66% of the power spent by the baseline, while the IL and DACC spend 52%. The significant decrease on the power spent by CLDI is explained by the centralized training, which make more training data available, CLDI has 120 new data points for each TTI while the other architectures have only 1, and it indicates that cooperative behavior arise among the MTDs. This is also reflected on the collision's performance, where CLDI experiences around 2.25% of the baseline collisions and IL and DACC experience around 14%.

The IL architectures does not require a central cloud entity to work, therefore it cuts all the necessary overhead data transmission between MTDs and WAPs. However, each MTD has to perform training and inference of its ANN, which can be computationally expensive. Moreover, as each MTD is trained in a fully distributed manner, without sharing any information between themselves, there is no chance of cooperation arising. Both DACC and CLDI architectures require MTDs to transmit information about their local observations that cannot be inferred at the WAP, such as channel state information and the number of packets currently in the buffer. On the other hand, part of the training is done in the cloud for DACC, and completely in the cloud for CLDI, which offloads some of the computational burden to the cloud, saving power and requiring less complex MTDs.

As discussed previously, for a smaller user density the IL and DACC architectures slightly outperform CLDI. However, for a higher density of MTDs, the CLDI architecture is able to leverage data from observations collected from all MTDs, and due to the centralized training, the MTDs work together to use the network resources more equitably, resulting in overwhelming power savings, small average delays, and a minimal number of dropped packets and collisions. So, for cellular networks designed to serve a smaller number of MTDs the IL and DACC architectures may be preferred, depending if the devices have enough computational power to train their ANN and how much overhead is tolerated. While for cellular networks designed to support a massive number of low-cost devices the CLDI architecture may be recommended.

Figure 12:
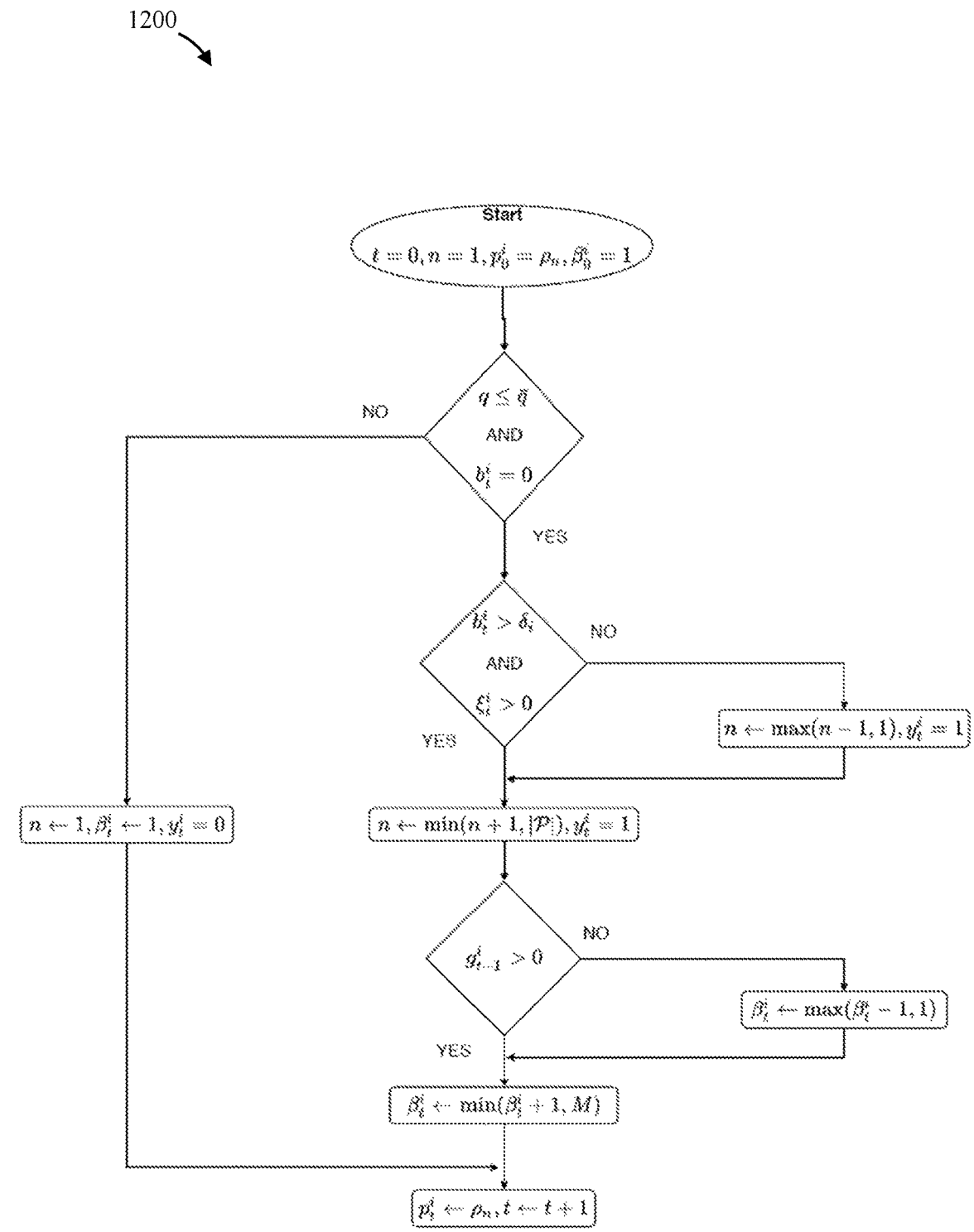
FIG. 12 is a flowchart of the baseline algorithm.

FIG. 12 illustrates the baseline algorithm 1200 used for comparing with experimental results. Firstly, each device with packets to transmit in the buffer draws a random number q~U([0,1]), if $q \leq \bar{q}$ the device tries to access the channel, where $\bar{q} \in (0,1)$ is a threshold selected by the system designer. This is employed to avoid congestion by having all devices trying to access the channel at the same time. Furthermore, if the MTD is currently violating its delay constraints or if there was a dropped packet in the last TTI, the device ramps up its power. Afterwards, if at least one packet was successfully transmitted on the last TTI, the MTD assumes it is facing a good channel condition and it increases the transmission modulation order, otherwise, it assumes a bad channel and decreases it.

Further details are provided here concerning an ANN that can be used with the techniques described herein. For example, one of the requirements may be that the ANN should be shallow and relatively small to keep a light memory footprint on the devices and to reduce the computational complexity on training and inference. A Grated Recurrent Unit (GRU) unit connected to a two-layer perceptron may be considered. As the observations of the MTDs are temporally correlated (through the number of packets in the buffer, and the channel gains) a GRU unit is included in the input to extract information from sequences of states. GRUs are employed as it has been shown that they have comparable performance to the more commonly used long short-term memory (LSTM) units while being more computationally efficient. In the model presented herein, an GRU with $N_B N_S + 4$ inputs is considered, where $N_B N_S$ inputs are due to the channel state information, and the remaining four are the number of packets in the buffer ($b_t^i$), the number of arriving packets WA the goodput on the previous TTI ($g_{t-1}^i$) and the number of overflown packets in the previous TTI The GRU unit has 32 output values, both of the linear layers have 32 inputs and 32 outputs. Finally, the actor head has 32 inputs and $2M| X |N_S$ output layers (one for each possible action), while the critic head has 32 inputs and one output (the critic value).

The networks are trained using an adaptive moment estimation (ADAM) optimizer with learning rate of $7 \times 10^{-4}$. At each ANN network update, the weights are trained over 4 PPO epochs with 10 minibatches per epoch. To avoid large gradient updates that make the optimization unstable, the gradients are clipped such that $\|\nabla J_w\| \leq 0.5$. A value loss coefficient $k_1 = 0.5$ and an entropy loss coefficient $k_2 = 0.01$ are used.

Figure 13:
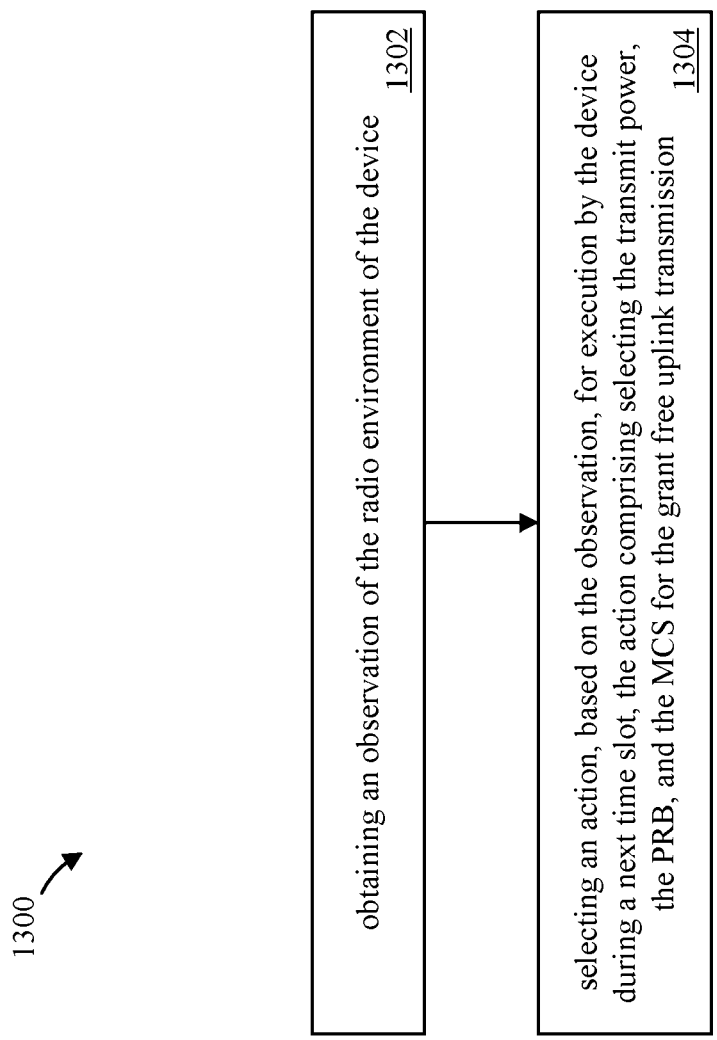
FIG. 13 is a flowchart of a method for selecting, for a machine to machine (M2M) type device, a transmit power, a physical resource block (PRB), and a modulation and coding scheme (MCS) for a grant free uplink transmission.

FIG. 13 illustrates a method 1300 for selecting, for device, which may be a machine to machine (M2M) type device, a transmit power, a physical resource block (PRB), and a modulation and coding scheme (MCS) for a grant free uplink transmission. The method comprises obtaining, step 1302, an observation of the radio environment of the device. The method comprises selecting, step 1304, an action, based on the observation, for execution by the device during a next time slot, the action comprising selecting the transmit power, the PRB, and the MCS for the grant free uplink transmission.

The observation may comprise a packet buffer length, denoting a number of packets queued in a buffer, a complex channel between at least one MTD and Base Stations on each of a plurality of subcarriers, and a dynamic power management state of the at least one MTD.

In the method, the action may be selected by an actor and the actor may be a first trained neural network. In the method, the action may incur a reward and the actor learns a policy that maximizes the reward.

The method may further comprise training the first neural network based on previous selected actions, previous observations, previous rewards and a critic value.

In the method, the critic value may be provided by a critic and the critic may be a second trained neural network. The first and second trained neural networks may be the same. The critic value may be a value of a current state that is a function of a current time and of the observed environment at the current time. The state may include the Channel State Information (CSI), arriving packets, overflow, goodput and buffer load.

The method may further comprise a step of training the second neural network based on previous CSI, arriving packets, overflow, goodput and buffer load.

In the method, the actor and the critic may be trained locally in the device.

Alternatively, the actor may be trained in the device and the critic may be trained in a cloud computing environment. The critic trained in the cloud computing environment may be the same for a plurality of devices and each of the devices may listen to a radio channel to get the critic value. The radio channel may be a broadcast channel. The critic value may be broadcasted to the devices.

Alternatively, the actor and the critic may be both trained in a cloud computing environment. The actor and the critic trained in the cloud computing environment may be the same for a plurality of devices and each of the devices may listen to a radio channel to get weights of the actor neural network and to get the critic value. The weights of the actor neural network may be used by the device to update a local actor neural network in the device. The radio channel may be the random-access channel or another radio channel. The weight of the actor neural network and the critic value may be broadcasted to the devices.

Figure 14:
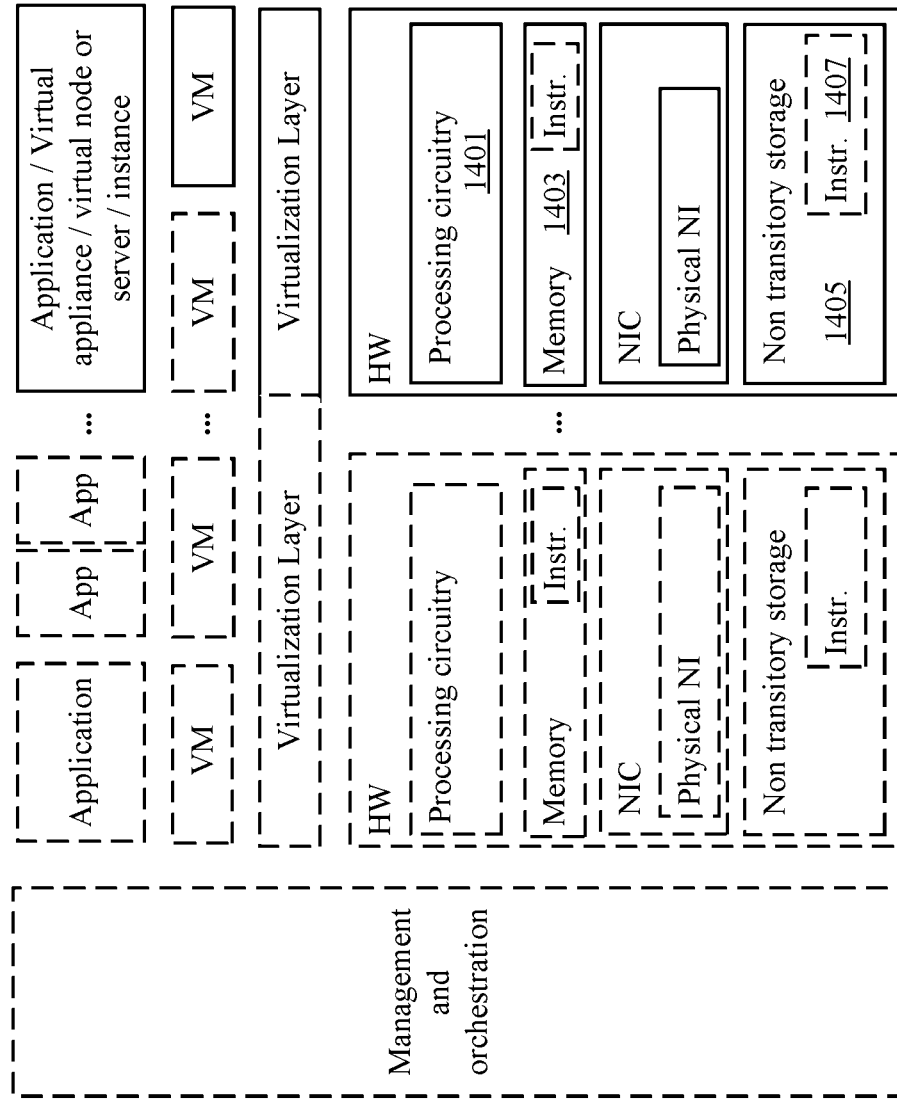
FIG. 14 is a schematic illustration of a virtualization environment in which the different methods, devices, apparatuses or systems described herein can be deployed.

Referring to FIG. 14, there is provided a virtualization environment in which functions and steps described herein can be implemented.

A virtualization environment (which may go beyond what is illustrated in FIG. 14), may comprise systems, networks, servers, nodes, devices, etc., that are in communication with each other either through wire or wirelessly. Some or all of the functions and steps described herein may be implemented as one or more virtual components (e.g., via one or more applications, components, functions, virtual machines or containers, etc.) executing on one or more physical apparatus in one or more networks, systems, environment, etc.

A virtualization environment provides hardware comprising processing circuitry 1401 and memory 1403. The memory can contain instructions executable by the processing circuitry whereby functions and steps described herein may be executed to provide any of the relevant features and benefits disclosed herein.

The hardware may also include non-transitory, persistent, machine readable storage media 1405 having stored therein software and/or instruction 1407 executable by processing circuitry to execute functions and steps described herein.

Figure 15:
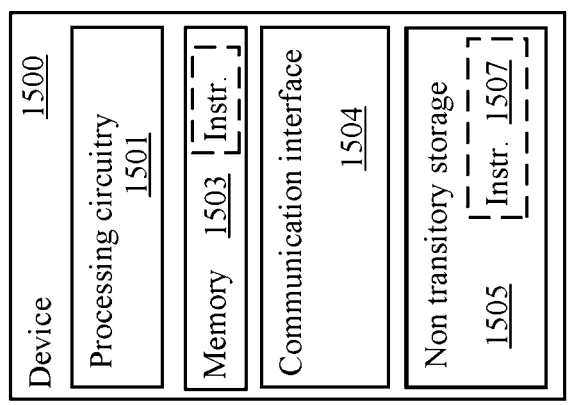
FIG. 15 is a schematic illustration of an example device.

FIG. 15 is a schematic illustration of a device 1500, which may be a M2M device, which comprises a memory 1503, 1505, processing circuitry 1501 and communication interface 1504 which may be wired and/or wireless and which may be standard compliant with fifth generation (5G), Long term evolution (LTE), Wi-Fi or any other suitable communications standard. The M2M device 1500 comprises instructions 1507 that can be executed by the processing circuitry 1501 to execute any of the functions described herein.

There is provided a device 1500 for selecting a transmit power, a physical resource block (PRB), and a modulation and coding scheme (MCS) for a grant free uplink transmission. The device comprising processing circuits 1501 and a memory 1503, the memory containing instructions 1507 executable by the processing circuits. The device is operative to obtain an observation of the radio environment of the device. The device is operative to select an action, based on the observation, for execution during a next time slot, the action comprising selecting the transmit power, the PRB, and the MCS for the grant free uplink transmission.

The device may be a machine to machine (M2M) type device 1500 or a HW (as illustrated in FIG. 14). The device may be part of a virtualized environment, it may alternatively be a virtual instance, a server in the cloud, a network node, a radio base station or any other type of suitable hardware in communication with the M2M device.

The observation may comprise a packet buffer length, denoting a number of packets queued in a buffer, a complex channel between at least one MTD and Base Stations on each of a plurality of subcarriers, and a dynamic power management state of the at least one MTD. The action may be selected by an actor and the actor may be a first trained neural network. The action may incur a reward and the actor may learn a policy that maximizes the reward.

The device may be further operative to train the first neural network based on previous selected actions, previous observations, previous rewards and a critic value. The critic value may be provided by a critic and the critic may be a second trained neural network. The first and second trained neural networks may be the same. The critic value may be a value of a current state that is a function of a current time and of the observed environment at the current time. The state may include the Channel State Information (CSI), arriving packets, overflow, goodput and buffer load.

The device may be further operative to train the second neural network based on previous Channel State Information (CSI), arriving packets, overflow, goodput and buffer load. The actor and the critic may be trained in the device.

Alternatively, the actor may be trained in the device and the critic may be trained in a cloud computing environment. The critic trained in the cloud computing environment may be the same for a plurality of devices and each of the plurality of devices may be operative to listen to a radio channel to get the critic value. The radio channel may be a broadcast channel and the critic value may be broadcasted to the devices.

Alternatively, the actor and the critic may be both trained in a cloud computing environment. The actor and the critic trained in the cloud computing environment may be the same for a plurality of devices and each of the devices may listen to a radio channel to get weights of the actor neural network and to get the critic value. The weights of the actor neural network may be used by each of the plurality of devices to update a local actor neural network in the device. The radio channel may be a random-access channel or another radio channel. The weights of the actor neural network and the critic value may be broadcasted to the devices.

The device is further operative to execute any of the functions described herein.

There is provided a non-transitory computer readable media 1407, 1507 having stored thereon instructions for selecting, for a machine to machine (M2M) type device, a transmit power, a physical resource block (PRB), and a modulation and coding scheme (MCS) for a grant free uplink transmission. The instructions comprise obtaining an observation the radio environment of the M2M device. The instructions comprise selecting an action, based on the observation, for execution by the M2M device during a next time slot, the action comprising selecting the transmit power, the PRB, and the MCS for the grant free uplink transmission.

The instructions may further comprise instructions to execute any of the functions described herein.

Modifications will come to mind to one skilled in the art having the benefit of the teachings presented in the foregoing description and the associated drawings. Therefore, it is to be understood that modifications, such as specific forms other than those described above, are intended to be included within the scope of this disclosure. The previous description is merely illustrative and should not be considered restrictive in any way. Although specific terms may be employed herein, they are used in a generic and descriptive sense only and not for purposes of limitation.

The invention claimed is:

1. A method for selecting, for a device, a transmit power, a physical resource block (PRB), and a modulation and coding scheme (MCS) for a grant free uplink transmission, comprising:
    obtaining an observation of the radio environment of the device; and
    selecting an action, based on the observation, for execution by the device during a next time slot, the action comprising selecting the transmit power, the PRB, and the MCS for the grant free uplink transmission.

2. The method of claim 1, wherein the device is a machine to machine (M2M) type device.

3. The method of claim 1, wherein the observation comprises a packet buffer length, denoting a number of packets queued in a buffer, a complex channel between at least one Machine Type Device (MTD) and Base Stations on each of a plurality of subcarriers, and a dynamic power management state of the at least one MTD.

4. The method of claim 1, wherein the action is selected by an actor and the actor is a first trained neural network.

5. The method of claim 4, wherein the action incurs a reward and the actor learns a policy that maximizes the reward.

6. The method of claim 4, further comprising training the first neural network based on previous selected actions, previous observations, previous rewards and a critic value.

7. The method of claim 6, wherein the critic value is provided by a critic and the critic is a second trained neural network.

8. The method of claim 7, wherein the actor and the critic are trained in the device.

9. The method of claim 7, wherein the actor is trained in the device and the critic is trained in a cloud computing environment and wherein the critic trained in the cloud computing environment is the same for a plurality of devices and each of the plurality of devices listens to a radio channel to get the critic value.

10. The method of claim 9, wherein the radio channel is a broadcast channel and the critic value is broadcasted to the devices.

11. The method of claim 10, wherein the radio channel is a random-access channel or another radio channel and wherein the weights of the actor neural network and the critic value are broadcasted to the devices.

12. The method of claim 7, wherein the actor and the critic are both trained in a cloud computing environment and wherein the actor and the critic trained in the cloud computing environment are the same for a plurality of devices and each of the devices listen to a radio channel to get weights of the actor neural network and to get the critic value and wherein the weights of the actor neural network are used by each of the plurality of devices to update a local actor neural network in the device.

13. The method of claim 6, wherein the critic value is a value of a current state that is a function of a current time and of the observed environment at the current time.

14. The method of claim 13, wherein the state includes the Channel State Information (CSI), arriving packets, overflow, goodput and buffer load and further comprising a step of training the second neural network based on previous Channel State Information (CSI), arriving packets, overflow, goodput and buffer load.

15. A device for selecting a transmit power, a physical resource block (PRB), and a modulation and coding scheme (MCS) for a grant free uplink transmission comprising processing circuits and a memory, the memory containing instructions executable by the processing circuits whereby the device is operative to:
    obtain an observation of the radio environment of the device; and
    select an action, based on the observation, for execution during a next time slot, the action comprising selecting the transmit power, the PRB, and the MCS for the grant free uplink transmission.

16. The device of claim 15, wherein the device is a machine to machine (M2M) type device.

17. The device of claim 15, wherein the observation comprises a packet buffer length, denoting a number of packets queued in a buffer, a complex channel between at least one Machine Type Device (MTD) and Base Stations on each of a plurality of subcarriers, and a dynamic power management state of the at least one MTD.

18. The device of claim 15, wherein the action is selected by an actor and the actor is a first trained neural network.

19. The device of claim 18, wherein the action incurs a reward and the actor learns a policy that maximizes the reward.

20. The device of claim 18, further operative to train the first neural network based on previous selected actions, previous observations, previous rewards and a critic value.

21. The device of claim 20, wherein the critic value is provided by a critic and the critic is a second trained neural network.

22. The device of claim 21, wherein the actor and the critic are trained in the device.

23. The device of claim 21, wherein is trained in the device and the critic is trained in a cloud computing environment and wherein the critic trained in the cloud computing environment is the same for a plurality of devices and each of the plurality of devices is operative to listen to a radio channel to get the critic value.

24. The device of claim 23, wherein the radio channel is a broadcast channel and the critic value is broadcasted to the devices.

25. The device of claim 24, wherein the radio channel is a random-access channel or another radio channel and wherein the weights of the actor neural network and the critic value are broadcasted to the devices.

26. The device of claim 21, wherein the actor and the critic are both trained in a cloud computing environment and wherein the actor and the critic trained in the cloud computing environment are the same for a plurality of devices and each of the devices listen to a radio channel to get weights of the actor neural network and to get the critic value and wherein the weights of the actor neural network are used by each of the plurality of devices to update a local actor neural network in the device.

27. The device of claim 20, wherein the critic value is a value of a current state that is a function of a current time and of the observed environment at the current time.

28. The device of claim 27, wherein the state includes the Channel State Information (CSI), arriving packets, overflow, goodput and buffer load and further operative to train the second neural network based on previous Channel State Information (CSI), arriving packets, overflow, goodput and buffer load.

29. A non-transitory computer readable media having stored thereon instructions for selecting a transmit power, a physical resource block (PRB), and a modulation and coding scheme (MCS) for a grant free uplink transmission, the instructions comprising:
- obtaining an observation of the radio environment of the device; and
- selecting an action, based on the observation, for execution by the device during a next time slot, the action comprising selecting the transmit power, the PRB, and the MCS for the grant free uplink transmission.

* * * * *